(12) United States Patent
Li et al.

(10) Patent No.: US 12,490,241 B2
(45) Date of Patent: Dec. 2, 2025

(54) RESOURCE INDICATION METHOD, RESOURCE DETERMINING METHOD, AND APPARATUS

(71) Applicant: Huawei Technologies Co., Ltd., Shenzhen (CN)

(72) Inventors: Chao Li, Beijing (CN); Haining Huang, Beijing (CN); Zhe Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 383 days.

(21) Appl. No.: 17/887,168

(22) Filed: Aug. 12, 2022

(65) Prior Publication Data

US 2022/0394695 A1 Dec. 8, 2022

Related U.S. Application Data

(63) Continuation of application No. PCT/CN2020/075434, filed on Feb. 14, 2020.

(51) Int. Cl.
*H04W 72/04* (2023.01)
*H04W 72/044* (2023.01)

(52) U.S. Cl.
CPC ............................... *H04W 72/044* (2013.01)

(58) Field of Classification Search
CPC ........... H04W 72/044; H04W 72/0446; H04W 72/0453; H04W 72/20; H04W 72/02; H04W 72/23; H04L 5/0094
See application file for complete search history.

(56) References Cited

U.S. PATENT DOCUMENTS

| 5,506,862 A | 4/1996 | McIntosh |
| 2004/0179547 A1 | 9/2004 | Kuffner et al. |
| (Continued) | | |

FOREIGN PATENT DOCUMENTS

| CN | 104468019 A | 3/2015 |
| CN | 106534020 A | 3/2017 |
| (Continued) | | |

OTHER PUBLICATIONS

LG Electronics, "Discussion on resource allocation for Mode 2," 3GPP TSG RAN WG1 Meeting #100, R1-2000783, e-Meeting, Total 17 pages 3rd Generation Partnership Project, Valbonne, France (Feb. 24-Mar. 6, 2020).

(Continued)

*Primary Examiner* — Awet Haile
(74) *Attorney, Agent, or Firm* — Leydig, Voit & Mayer, Ltd.

(57) ABSTRACT

In the field of communications technologies, disclosed are a resource indication method, a resource determining method, and an apparatus, to indicate different resources by using a value of same resource indication information, and can be applied to an internet of vehicles, for example, vehicle-to-everything (V2X), long term evolution-vehicular (LTE-V), and vehicle-to-vehicle (V2V), or in fields such as device-to-device (D2D), intelligent driving, and intelligent connected vehicles. The method includes: determining a first resource in a first slot and a second resource in a second slot, where the first resource and the second resource are used to send data; and sending resource indication information in a third slot, where a value of the resource indication information is used to indicate a frequency domain position of the first resource and a frequency domain position of the second resource, and the second slot and the first slot are later than the third slot.

15 Claims, 7 Drawing Sheets

(56) References Cited

U.S. PATENT DOCUMENTS

| | | | |
|---|---|---|---|
| 2017/0150483 A1* | 5/2017 | Zhang | .............. H04W 72/1273 |
| 2019/0081769 A1 | 3/2019 | Zhang et al. | |
| 2022/0346118 A1* | 10/2022 | Wu | ..................... H04L 5/0044 |
| 2022/0361232 A1* | 11/2022 | Zhao | ..................... H04W 72/20 |
| 2022/0369291 A1* | 11/2022 | Shibaike | .............. H04L 1/1887 |

FOREIGN PATENT DOCUMENTS

| | | | |
|---|---|---|---|
| CN | 108513356 | A | 9/2018 |
| CN | 110267227 | A | 9/2019 |
| CN | 110351859 | A | 10/2019 |
| CN | 110519030 | A | 11/2019 |
| CN | 108886811 | B | 10/2020 |
| EP | 3739913 | A1 | 11/2020 |
| KR | 20227031616 | | 1/2025 |
| WO | 2018027822 | A1 | 2/2018 |
| WO | 2018170673 | A1 | 9/2018 |
| WO | 2018201494 | A1 | 11/2018 |
| WO | 2020006736 | A1 | 1/2020 |

OTHER PUBLICATIONS

ZTE et al., "Remaining issues for data resource allocation," 3GPP TSG RAN WG1 Meeting AH 1801, Vancouver, Canada, R1-1800138, Total 3 pages 3rd Generation Partnership Project, Valbonne, France (Jan. 22-26, 2018).

"3rd Generation Partnership Project; Technical Specification Group Radio Access Network; NR; Physical layer procedures for data (Release 16)," 3GPP TS 38.214 V16.0.0, Total 147 pages, 3rd Generation Partnership Project, Valbonne, France (Dec. 2019).

Apple, "Resource Allocation for Mode 2," 3GPP TSG RAN WG1 #99, R1-1912812, Reno, USA, Total 9 pages, 3rd Generation Partnership Project, Valbonne, France (Nov. 18-22, 2019).

NEC Group et al., "Uplink Resource Allocation for E-Utra," TSG-RAN WG1#48, St. Louis Missouri, USA, R1-070881, Total 4 pages (Feb. 12-16, 2007).

Ericsson, "E-mail discussion summary on downlink control signaling," TSG-RAN WG1 #50, Athens, Greece, R1-073750, Total 34 pages (Aug. 20-24, 2007).

MCC Supoort, "Draft Report of 3GPP TSG RAN WG1 #50 v0.2.0 (Athens, Greece, Aug. 20-24, 2007)," 3GPP TSG RAN WG1 Meeting #50b, Shanghai, China, R1-073896, Total 59 pages, 3rd Generation Partnership Project, Valbonne, France (Oct. 8-12, 2007).

Intel Corporation, "Sidelink physical structure for NR V2X communication," 3GPP TSG RAN WG1 Meeting #99, Reno, Nevada, USA, R1-1912203, Total 34 pages (Nov. 18-22, 2019).

ZTE et al., "NR sidelink physical layer structure," 3GPP TSG RAN WG1 #99, Reno, USA, R1-1912514, Total 12 pages (Nov. 18-22, 2019).

Intel Corporation, "Summary#2 for AI 7.2.4.2.2 Mode-2 Resource Allocation," 3GPP TSG RAN WG1 Meeting #99, Reno, Nevada, USA, R1-1913450, Total 42 pages, 3rd Generation Partnership Project, Valbonne, France (Nov. 18-22, 2019).

Oppo, "Mode 1 resource allocation for NR SL [online]," 3GPP TSG RAN WG1 #99, Reno, USA, Internet URL:https://www.3gpp.org/ftp/tsg_ran/WG1_RL1/TSGR1_99/Docs/R1-1912790.zip>, R1-1912790, Total 12 pages, 3rd Generation Partnership Project, Valbonne, France (Nov. 8, 2019).

"Summary#4 for AI 7.2.4.2.2 Mode-2 Resource Allocation," Intel Corporation, 3GPP TSG RAN WG1 Meeting #99, R1-1913569, Reno, Nevada, USA, total 46 pages, 3rd Generation Partnership Project, Valbonne, France (Nov. 18-22, 2019).

"Physical Layer Procedures for NR V2X Sidelink," Apple, 3GPP TSG RAN WG1 #99 R1-1912814, Reno, USA, total 6 pages, 3rd Generation Partnership Projectm Valbonne, France (Nov. 18-22, 2019).

\* cited by examiner

RESOURCE INDICATION METHOD, RESOURCE DETERMINING METHOD, AND APPARATUS

CROSS-REFERENCE TO RELATED APPLICATIONS

This application is a continuation of International Application No. PCT/CN2020/075434, filed on Feb. 14, 2020, the disclosure of which is hereby incorporated by reference in its entirety.

TECHNICAL FIELD

Embodiments of this application relate to the field of communications technologies, and in particular, to a resource indication method, a resource determining method, and an apparatus.

BACKGROUND

In a network with a long term evolution (LTE) technology proposed by the 3rd generation partnership project (3GPP), a vehicle-to-everything (V2X) internet of vehicles technology is standardized. Device-to-device (D2D) communication, vehicle-to-vehicle (V2V) communication, vehicle-to-pedestrian V2P (V2P) communication, or vehicle-to-infrastructure/network V2I/N (V2I/N) communication is a technology for direct communication between terminal devices. V2V, V2P, and V2I/N are collectively referred to as V2X, namely, vehicle-to-everything. Generally, direct communication between devices is also referred to as direct communication or sidelink communication.

In an existing communications system, a transmitting device may indicate, to a receiving device by using resource indication information, a position of a frequency domain resource in a slot after a current slot in addition to a currently scheduled resource. After receiving the resource indication information of the frequency domain resource, the receiving device may determine the frequency domain resource in the corresponding slot based on the resource indication information, and then perform receiving and demodulation on the corresponding frequency domain resource, so that a corresponding resource can be detected, thereby implementing communication. The resource indication information can indicate only a position of one frequency domain resource in a subsequent slot.

SUMMARY

Embodiments of this application provide a resource indication method, a resource determining method, and an apparatus, to indicate different resources by using a value of same resource indication information.

To achieve the foregoing objective, the embodiments of this application provide the following technical solutions:

According to a first aspect, an embodiment of this application provides a resource indication method. The method is performed by a transmitting apparatus, and the transmitting apparatus may be a terminal apparatus, or the transmitting apparatus may be a terminal apparatus or a network device. The method includes: determining a first resource in a first slot and a second resource in a second slot, where the first resource and the second resource are used to send data; and sending resource indication information in a third slot before the first slot and the second slot, where a value of the resource indication information is used to indicate a frequency domain position of the first resource and a frequency domain position of the second resource. In other words, the second slot and the first slot are later than the third slot.

This embodiment of this application provides the resource indication method. According to the method, the first resource in the first slot and the second resource in the second slot are determined, and the resource indication information is sent, where the value of the resource indication information may indicate the frequency domain position of the first resource and the frequency domain position of the second resource. Therefore, a receiving end (for example, a receiving apparatus) may determine, based on the value of the resource indication information, the frequency domain positions of the two resources (for example, the first resource and the second resource) selected by a transmitting end (for example, the transmitting apparatus). Compared with using identifiers of the resources to indicate the positions of the resources, using the value of the resource indication information to indicate the positions of the two resources selected by the transmitting apparatus can further reduce signaling overheads.

In a possible implementation, the first resource and the second resource are resources occupied by data sent by the transmitting apparatus. In this way, the receiving apparatus can determine to receive the data from the transmitting apparatus on the first resource and the second resource.

In a possible implementation, the first resource and the second resource are reserved resources. In this way, the receiving apparatus can determine that the first resource and the second resource have been occupied or selected, and subsequently the receiving apparatus can avoid the first resource and the second resource when selecting a resource.

In a possible implementation, the resource indication information in this embodiment of this application is used to assist the receiving apparatus in determining an available resource.

In a possible implementation, the frequency domain position of the first resource includes one or more of a frequency domain starting position, a frequency domain ending position, or a frequency domain middle position of the first resource, or a position indicated by signaling; and the frequency domain position of the second resource includes one or more of a frequency domain starting position, a frequency domain ending position, or a frequency domain middle position of the second resource, or a position indicated by signaling.

In a possible implementation, the method provided in this embodiment of this application further includes: sending a first data packet on a third resource in the third slot, sending a second data packet on the first resource, and sending a third data packet on the second resource, where the second data packet and the third data packet are different from the first data packet, or the second data packet and the third data packet are retransmitted data packets of the first data packet. The first resource and the second resource that are indicated by the transmitting apparatus may be used to retransmit the first data packet, so that when the first data packet fails to be transmitted, the first data packet can be retransmitted in time by using the first resource and the second resource, thereby ensuring data transmission reliability. The first resource and the second resource may further be used to transmit another data packet, so that when the first data packet is successfully transmitted, the first resource and the second resource are used to transmit another data packet, thereby ensuring timely data transmission.

In a possible implementation, the method provided in this embodiment of this application further includes: determining the value of the resource indication information based on the frequency domain starting position of the first resource, the frequency domain starting position of the second resource, and a first frequency domain bandwidth, where the first frequency domain bandwidth is a frequency domain bandwidth of the first resource or a frequency domain bandwidth of the second resource. In this way, a manner of determining the value of the resource indication information is more flexible.

In a possible implementation, the frequency domain bandwidth of the first resource is the same as the frequency domain bandwidth of the second resource.

In a possible implementation, the value of the resource indication information is further determined based on a second frequency domain bandwidth, and the second frequency domain bandwidth is a frequency domain bandwidth of a resource pool.

In a possible implementation, the value of the resource indication information is further determined using one element or a combination of a plurality of elements of the following elements: the square of the second frequency domain bandwidth, the cube of the second frequency domain bandwidth, the second frequency domain bandwidth, and a difference between the second frequency domain bandwidth and the first frequency domain bandwidth.

In a possible implementation, the value of the resource indication information satisfies:

$RIV=f(N)-f(N-(L-1))+(N-(L-1))*S_0+S_1$, where $S_0$ represents the frequency domain starting position of the first resource; $S_1$ represents the frequency domain starting position of the second resource; L represents the first frequency domain bandwidth; N represents the second frequency domain bandwidth; $S_0$, $S_1$, N, and L are integers; RIV represents the value of the resource indication information; and f(N) represents a function of an input value N.

In a possible implementation, $f(N)=N(N+1)(2N+1)/6$.

In a possible implementation, the value of the resource indication information is further determined based on one element or a combination of a plurality of elements of the following elements: $N^2$, $S_0$, $S_1$, (L−1), (N−L−$S_0$), (N−1−S), and/or N−L+1, where $S_0$ represents the frequency domain starting position of the first resource; $S_1$ represents the frequency domain starting position of the second resource; L represents the first frequency domain bandwidth; N represents the second frequency domain bandwidth; and $S_0$, $S_1$, N, and L are integers.

In a possible implementation, the value of the resource indication information satisfies:

$RIV=N^2*(L-1)+(N-L+1)*S_0+S_1$; or $RIV=N^2*(N-L+1)+L*(N-L-S_0)+(N-1-S_1)$, where RIV represents the value of the resource indication information; N represents the second frequency domain bandwidth; L represents the first frequency domain bandwidth; $S_0$ represents the frequency domain starting position of the first resource; $S_1$ represents the frequency domain starting position of the second resource; and $S_0$, $S_1$, N, and L are integers.

In a possible implementation, when L or L−1 is less than or equal to a first limit, the value of the resource indication information satisfies:

$RIV=N^2*(L-1)+(N-L+1)*S_0+S_1$.

In a possible implementation, when L or L−1 is greater than or equal to a second limit, the value of the resource indication information satisfies:

$RIV=N^2*(N-L+1)+L*(N-L-S_0)+(N-1-S_1)$.

In a possible implementation, the first limit and the second limit in this embodiment of this application may be the same, or may be different. The first limit and the second limit may be autonomously determined by the transmitting apparatus, or may be pre-defined in a protocol, or may be obtained by the transmitting apparatus by querying a first preset table. It may be understood that the first preset table includes corresponding first limits and second limits when N is of different values.

In a possible implementation, the first limit and the second limit in this embodiment of this application may be determined using any one of the following: N/2, $\lfloor N/2 \rfloor$, or $\lceil N/2 \rceil$. For example, the first limit is $\lfloor N/2 \rfloor$, and the second limit is N/2.

In a possible implementation, $S_0$, $S_1$, N, and L satisfy the following conditions: $0 \leq S_1 \leq N-1$, $0 \leq S_0 \leq N-1$, $1 \leq L \leq N$, $L+S_0 \leq N$, and $L+S_1 \leq N$.

In a possible implementation, a quantity of bits occupied by the resource indication information is less than or equal to a first threshold. Therefore, a theoretical minimum quantity of bits is achieved, thereby reducing the signaling overheads.

In a possible implementation, the first threshold may be autonomously determined by the transmitting apparatus (for example, determined by the transmitting apparatus based on N), or may be pre-defined in a protocol, or the first threshold may be obtained by the transmitting apparatus by querying a second preset table. The second preset table includes at least first thresholds obtained based on N when N is of different values.

In a possible implementation, the first threshold is obtained according to a formula $\lfloor \log_2^{(N(N+1)(2N+1)/6)} \rfloor, \lceil \log_2^{(N(N+1)(2N+1)/6)} \rceil$ or $\log_2^{(N(N+1)(2N+1)/6)}$.

In a possible implementation, the frequency domain position of the first resource may alternatively be replaced with a code domain position of the first resource or a space domain position of the first resource, the frequency domain position of the second resource may alternatively be replaced with a code domain position of the second resource or a space domain position of the second resource, and the frequency domain position of the first resource is the same as or different from the frequency domain position of the second resource.

In a possible implementation, the first resource and the second resource are resources in time domain, resources in frequency domain, resources in code domain, or resources in space domain.

In a possible implementation, the first slot and the second slot may be a same slot.

In a possible implementation, the resource indication information is carried in any one of the following messages: a system message, a radio resource control (RRC) message, downlink control information (DCI), sidelink control information (SCI), and a media access control (MAC) message.

According to a second aspect, an embodiment of this application provides a resource determining method. The method is performed by a receiving apparatus, and the receiving apparatus may be a terminal apparatus, or the receiving apparatus may be a terminal apparatus or a network device. The method includes: receiving resource indication information from a first device (for example, a transmitting apparatus) in a third slot, where a value of the resource indication information is used to indicate a frequency domain position of a first resource in a first slot and a frequency domain position of a second resource in a second slot, the first slot and the second slot are later than the third slot, and the first resource and the second resource are candidate sending resources of the first device; and determining a frequency domain starting position of the first resource and a frequency domain starting position of the second resource based on the resource indication information.

In a possible implementation, the method provided in this embodiment of this application further includes: detecting data on the first resource and the second resource.

In a possible implementation, the method provided in this embodiment of this application further includes: determining an available resource based on the resource indication information.

In a possible implementation, the method provided in this embodiment of this application further includes: determining a first frequency domain bandwidth based on the resource indication information, where the first frequency domain bandwidth is a frequency domain bandwidth of the first resource or a frequency domain bandwidth of the second resource.

In a possible implementation, the method provided in this embodiment of this application further includes: determining the frequency domain position of the first resource based on the frequency domain starting position of the first resource and the first frequency domain bandwidth; and determining the frequency domain position of the second resource based on the frequency domain starting position of the second resource and the first frequency domain bandwidth.

In a possible implementation, the first frequency domain bandwidth is determined using the value of the resource indication information and the square of a second frequency domain bandwidth, and the second frequency domain bandwidth is a frequency domain bandwidth of a resource pool.

In a possible implementation, the first frequency domain bandwidth satisfies: $L=a+1$, $L=a$, or $L=N+1-a$, where $a=RIV/N^2$, $a=\lfloor RIV/N^2 \rfloor$, or $a=\lceil RIV/N^2 \rceil$; and L represents the first frequency domain bandwidth, N represents the second frequency domain bandwidth, and RIV represents the value of the resource indication information.

In a possible implementation, the determining a frequency domain starting position of the first resource and a frequency domain starting position of the second resource based on the resource indication information includes: determining the frequency domain starting position of the first resource and the frequency domain starting position of the second resource based on the resource indication information and the second frequency domain bandwidth, where the second frequency domain bandwidth is the frequency domain bandwidth of the resource pool.

In a possible implementation, the frequency domain starting position of the first resource or the frequency domain starting position of the second resource is determined using the value of the resource indication information and the square of the second frequency domain bandwidth.

In a possible implementation, the frequency domain starting position of the first resource or the frequency domain starting position of the second resource is determined using the value of the resource indication information and the cube of the second frequency domain bandwidth of the resource pool.

In a possible implementation, the frequency domain starting position of the first resource or the frequency domain starting position of the second resource is determined using the value of the resource indication information, the square of the second frequency domain bandwidth of the resource pool, and the first frequency domain bandwidth.

In a possible implementation, when a first value is less than or equal to a third limit, the frequency domain starting position of the first resource or the frequency domain starting position of the second resource is determined using $RIV-N^2*(L-1)$, L represents the first frequency domain bandwidth, N represents the second frequency domain bandwidth, and RIV represents the value of the resource indication information.

In a possible implementation, the frequency domain starting position of the first resource satisfies:

$$S_0=(RIV-N^2*(L-1))/(N-L+1) \text{ and/or } S_1=(RIV-N^2(L-1))\mod(N-L+1); \text{ or}$$

$$S_0=g(\{(N^2(N-L+1)+(L+1)(N-1)-RIV)/L\}) \text{ and/or}$$

$$S_1=\{(N^2(N-L+1)+(L+1)(N-1)-RIV)\} \mod L,$$

where g( ) represents a function for rounding up or rounding down an input variable, L represents the first frequency domain bandwidth, N represents the second frequency domain bandwidth, and RIV represents the value of the resource indication information.

In a possible implementation, when the first value is less than or equal to the third limit, the frequency domain starting position of the first resource satisfies: $S_0=(RIV-N^2*(L-1))/(N-L+1)$; and the frequency domain starting position of the second resource satisfies: $S_1=(RIV-N^2*(L-1))\mod(N-L+1)$, where L represents the first frequency domain bandwidth, N represents the second frequency domain bandwidth, RIV represents the value of the resource indication information, $S_0$ represents the frequency domain starting position of the first resource, and $S_1$ represents the frequency domain starting position of the second resource.

In a possible implementation, when a first value is greater than or equal to a fourth limit, the frequency domain starting position of the first resource or the frequency domain starting position of the second resource is determined using $N^2(N-L+1)$, where L represents the first frequency domain bandwidth, and N represents the second frequency domain bandwidth.

In a possible implementation, when the first value is greater than or equal to the fourth limit, the frequency domain starting position of the first resource or the frequency domain starting position of the second resource is determined using $$N^2(N-L+1)+(L+1)(N-1)-RIV.$$

In a possible implementation, when the first value is greater than or equal to the fourth limit, the frequency domain starting position of the first resource satisfies:

$$S_0=\lfloor\{(N^2(N-L+1)+(L+1)(N-1)-RIV)/L\}\rfloor \text{ or}$$

$S_0=\lceil\{(N^2(N-L+1)+(L+1)(N-1)-RIV)/L\}\rceil$; and/or the frequency domain starting position of the second resource satisfies:

$$S_1=\{(N^2(N-L+1)+(L+1)(N-1)-RIV)\}\mod L.$$

In a possible implementation, the first value is determined using the value of the resource indication information.

In a possible implementation, the first value is any one of the following: $\lfloor RIV/N^2 \rfloor$, $RIV/N^2$, $\lceil RIV/N^2 \rceil$, or the value of the resource indication information.

In a possible implementation, the third limit and the fourth limit in this embodiment of this application may be values pre-defined in a protocol, or may be obtained by the receiving apparatus from a third preset table, or the third limit or the fourth limit is autonomously determined by the receiving apparatus.

In a possible implementation, the third limit and the fourth limit are determined using the second frequency domain bandwidth, or the third limit and the fourth limit are determined using the second frequency domain bandwidth and the value of the resource indication information.

In a possible implementation, the third limit or the fourth limit is determined using anyone of the following: $N/2$, $\lfloor N/2 \rfloor$, $\lceil N/2 \rceil$, $RIV/N^3$, or $2RIV/N^3$.

In a possible implementation, in this embodiment of this application, the receiving resource indication information from a first device in a third slot includes: receiving any one of the following messages from the first device in the third slot: a system message, a radio resource control RRC message, downlink control information DCI, sidelink control information SCI, and a media access control MAC message, where any one of the system message, the radio resource control RRC message, the downlink control information DCI, the sidelink control information SCI, and the media access control MAC message includes the resource indication information.

According to a third aspect, an embodiment of this application provides a communications apparatus. The communications apparatus can implement the method according to any one of the first aspect or the possible implementations of the first aspect, and therefore can further implement beneficial effects according to any one of the first aspect or the possible implementations of the first aspect. The communications apparatus may be a transmitting apparatus (for example, the transmitting apparatus may be a terminal apparatus, a network device, or a chip used in a network device), or may be an apparatus that can support the communications apparatus in implementing the method according to any one of the first aspect or the possible implementations of the first aspect. The apparatus may implement the foregoing method by using software, hardware, or hardware executing corresponding software.

In an example, the communications apparatus includes a communications module and a processing module. The processing module is configured to determine a first resource in a first slot and a second resource in a second slot, where the first resource and the second resource are used to send data. The communications module is configured to send resource indication information in a third slot before the first slot and the second slot, where a value of the resource indication information is used to indicate a frequency domain position of the first resource and a frequency domain position of the second resource. In other words, the second slot and the first slot are later than the third slot.

In a possible implementation, the first resource and the second resource are resources occupied by data sent by a transmitting apparatus.

In a possible implementation, the first resource and the second resource are reserved resources.

In a possible implementation, the resource indication information in this embodiment of this application is used to assist a receiving apparatus in determining an available resource.

In a possible implementation, the frequency domain position of the first resource includes one or more of a frequency domain starting position, a frequency domain ending position, or a frequency domain middle position of the first resource, or a position indicated by signaling; and the frequency domain position of the second resource includes one or more of a frequency domain starting position, a frequency domain ending position, or a frequency domain middle position of the second resource, or a position indicated by signaling.

In a possible implementation, the first resource in this embodiment of this application may be a resource in a first resource set, and the second resource may be a resource in a second resource set. For example, the first resource set or the second resource set includes any one of a resource pool, a carrier, a bandwidth part, and a subband.

In a possible implementation, the communications module is further configured to: send a first data packet on a third resource in the third slot, send a second data packet on the first resource, and send a third data packet on the second resource, where the second data packet and the third data packet are different from the first data packet, or the second data packet and the third data packet are retransmitted data packets of the first data packet.

In a possible implementation, the processing module is further configured to determine the value of the resource indication information based on the frequency domain starting position of the first resource, the frequency domain starting position of the second resource, and a first frequency domain bandwidth, where the first frequency domain bandwidth is a frequency domain bandwidth of the first resource or a frequency domain bandwidth of the second resource.

In a possible implementation, the value of the resource indication information is further determined based on a second frequency domain bandwidth, and the second frequency domain bandwidth is a frequency domain bandwidth of a resource pool.

In a possible implementation, the value of the resource indication information is further determined using one element or a combination of a plurality of elements of the following elements: the square of the second frequency domain bandwidth, the cube of the second frequency domain bandwidth, the second frequency domain bandwidth, and a difference between the second frequency domain bandwidth and the first frequency domain bandwidth.

In a possible implementation, the value of the resource indication information satisfies: $RIV=f(N)-f(N-(L-1))+(N-(L-1))*S_0+S_1$, where $S_0$ represents the frequency domain starting position of the first resource; $S_1$ represents the frequency domain starting position of the second resource; L represents the first frequency domain bandwidth; N represents the second frequency domain bandwidth; $S_0$, $S_1$, N, and L are integers; RIV represents the value of the resource indication information; and f(N) represents a function of an input value N.

In a possible implementation, $$f(N)=N(N+1)(2N+1)/6.$$

In a possible implementation, the value of the resource indication information is further determined based on one element or a combination of a plurality of elements of the following elements: $N^2$, $S_0$, $S_1$, $(L-1)$, $(N-L-S_0)$, $(N-1-S_1)$, and/or $N-L+1$, where $S_0$ represents the frequency domain starting position of the first resource; $S_1$ represents the frequency domain starting position of the second resource; L represents the first frequency domain bandwidth; N represents the second frequency domain bandwidth; and $S_0$, $S_1$, N, and L are integers.

In a possible implementation, the value of the resource indication information satisfies:

$$RIV=N^{2}*(L-1)+(N-L+1)*S_{0}+S_{1}; \text{ or}$$

$$RIV=N^{2}*(N-L+1)+L*(N-L-S_{0})+(N-1-S_{1}),$$

where RIV represents the value of the resource indication information; N represents the second frequency domain bandwidth; L represents the first frequency domain bandwidth; $S_0$ represents the frequency domain starting position of the first resource; $S_1$ represents the frequency domain starting position of the second resource; and $S_0$, $S_1$, N, and L are integers.

In a possible implementation, when L or L−1 is less than or equal to a first limit, the value of the resource indication information satisfies:

$$RIV=N^{2}*(L-1)+(N-L+1)*S_{0}+S_{1}.$$

In a possible implementation, when L or L−1 is greater than or equal to a second limit, the value of the resource indication information satisfies:

$$RIV=N^{2}*(N-L+1)+L*(N-L-S_{0})+(N-1-S_{1}).$$

In a possible implementation, the first limit and the second limit in this embodiment of this application may be the same, or may be different. The first limit and the second limit may be autonomously determined by the transmitting apparatus, or may be pre-defined in a protocol, or may be obtained by the transmitting apparatus by querying a first preset table. It may be understood that the first preset table includes corresponding first limits and second limits when N is of different values.

In a possible implementation, the first limit and the second limit in this embodiment of this application may be determined using any one of the following: N/2, $\lfloor N/2 \rfloor$, or $\lceil N/2 \rceil$. For example, the first limit is $\lfloor N/2 \rfloor$, and the second limit is N/2.

In a possible implementation, $S_0$, $S_1$, N, and L satisfy the following conditions: $0 \leq S_1 \leq N-1$, $0 \leq S_0 \leq N-1$, $1 \leq L \leq N$, $L+S_0 \leq N$, and $L+S_1 \leq N$.

In a possible implementation, a quantity of bits occupied by the resource indication information is less than or equal to a first threshold. Therefore, a theoretical minimum quantity of bits is achieved, thereby reducing signaling overheads.

In a possible implementation, the first threshold may be autonomously determined by the transmitting apparatus (for example, determined by the transmitting apparatus based on N), or may be pre-defined in a protocol, or the first threshold may be obtained by the transmitting apparatus by querying a second preset table. The second preset table includes at least first thresholds obtained based on N when N is of different values.

In a possible implementation, the first threshold is obtained according to a formula $$\lfloor \log_{2}^{(N(N+1)(2N+1)/6)} \rfloor, \lceil \log_{2}^{(N(N+1)(2N+1)/6)} \rceil, \text{ or}$$
$$\log_{2}^{(N(N+1)(2N+1)/6)}.$$

In a possible implementation, the frequency domain position of the first resource may alternatively be replaced with a code domain position of the first resource or a space domain position of the first resource, the frequency domain position of the second resource may alternatively be replaced with a code domain position of the second resource or a space domain position of the second resource, and the frequency domain position of the first resource is the same as or different from the frequency domain position of the second resource.

In a possible implementation, the first resource and the second resource are resources in time domain, resources in frequency domain, resources in code domain, or resources in space domain.

In a possible implementation, the first slot and the second slot may be a same slot.

In a possible implementation, the resource indication information is carried in any one of the following messages: a system message, a radio resource control RRC message, downlink control information DCI, sidelink control information SCI, and a media access control MAC message.

For example, when the communications apparatus is a chip or a chip system used in a terminal device or a chip or a chip system used in a network device, the processing module may be a processor, and the communications module may be a communications interface. For example, the communications module may be an input/output interface, a pin, a circuit, or the like. The processing module executes instructions stored in a storage module, so that the communications apparatus implements the resource indication method according to any one of the first aspect or the possible implementations of the first aspect. The storage module may be a storage module (for example, a register or a cache) in the chip, or may be a storage module (for example, a read-only memory or a random access memory) that is in the transmitting device and that is located outside the chip.

According to a fourth aspect, an embodiment of this application provides a communications apparatus. The communications apparatus can implement the method according to any one of the second aspect or the possible implementations of the second aspect, and therefore can further implement beneficial effects according to any one of the second aspect or the possible implementations of the second aspect. The communications apparatus may be a receiving apparatus (for example, the receiving apparatus may be a terminal apparatus, a network device, or a chip or a chip system used in a network device). The apparatus may implement the foregoing method by using software, hardware, or hardware executing corresponding software.

In an example, the communications apparatus includes: a communications module, configured to receive resource indication information from a first device in a third slot, where a value of the resource indication information is used to indicate a frequency domain position of a first resource in a first slot and a frequency domain position of a second resource in a second slot, the first slot and the second slot are later than the third slot, and the first resource and the second resource are candidate sending resources of the first device; and a processing module, configured to determine a frequency domain starting position of the first resource and a frequency domain starting position of the second resource based on the resource indication information.

In a possible implementation, the communications module is further configured to detect data on the first resource and the second resource.

In a possible implementation, the processing module is further configured to determine an available resource based on the resource indication information.

In a possible implementation, the processing module is further configured to determine a first frequency domain bandwidth based on the value of the resource indication information, where the first frequency domain bandwidth is a frequency domain bandwidth of the first resource or a frequency domain bandwidth of the second resource.

In a possible implementation, the processing module is further configured to: determine the frequency domain position of the first resource based on the frequency domain starting position of the first resource and the first frequency domain bandwidth, and determine the frequency domain position of the second resource based on the frequency domain starting position of the second resource and the first frequency domain bandwidth.

In a possible implementation, the first frequency domain bandwidth is determined using the value of the resource indication information and the square of a second frequency domain bandwidth, and the second frequency domain bandwidth is a frequency domain bandwidth of a resource pool.

In a possible implementation, the first frequency domain bandwidth satisfies: $L=a+1$, $L=a$, or $L=N+1-a$, where $a=RIV/N^2$, $a=\lfloor RIV/N^2 \rfloor$, or $a=\lceil RIV/N^2 \rceil$; and L represents the first frequency domain bandwidth, N represents the second frequency domain bandwidth, and RIV represents the value of the resource indication information.

In a possible implementation, the processing module is further configured to determine the frequency domain starting position of the first resource and the frequency domain starting position of the second resource based on the value of the resource indication information and the second frequency domain bandwidth, and the second frequency domain bandwidth is the frequency domain bandwidth of the resource pool.

In a possible implementation, the frequency domain starting position of the first resource or the frequency domain starting position of the second resource is determined using the value of the resource indication information and the square of the second frequency domain bandwidth.

In a possible implementation, the frequency domain starting position of the first resource or the frequency domain starting position of the second resource is determined using the value of the resource indication information and the cube of the second frequency domain bandwidth of the resource pool.

In a possible implementation, the frequency domain starting position of the first resource or the frequency domain starting position of the second resource is determined using the value of the resource indication information, the square of the second frequency domain bandwidth of the resource pool, and the first frequency domain bandwidth.

In a possible implementation, when a first value is less than or equal to a third limit, the frequency domain starting position of the first resource or the frequency domain starting position of the second resource is determined using $RIV-N(L-1)$, where L represents the first frequency domain bandwidth, N represents the second frequency domain bandwidth, and RIV represents the value of the resource indication information.

In a possible implementation, the frequency domain starting position of the first resource satisfies:

$S_0=(RIV-N^{2*}(L-1))/(N-L+1)$ and/or $S_1=(RIV-N^{2*}(L-1)) \mod (N-L+1)$; or $S_0=g(\{(N^2(N-L+1)+(L+1)(N-1)-RIV)/L\})$ and/or $S_1=\{(N^2(N-L+1)+(L+1)(N-1)-RIV)\} \mod L$, where g( ) represents a function for rounding up or rounding down an input variable, L represents the first frequency domain bandwidth, N represents the second frequency domain bandwidth, and RIV represents the value of the resource indication information.

In a possible implementation, when a first value is less than or equal to a third limit, the frequency domain starting position of the first resource satisfies: $S_0=(RIV-N^{2*}(L-1))/(N-L+1)$; and the frequency domain starting position of the second resource satisfies: $S_1=(RIV-N^{2*}(L-1)) \mod (N-L+1)$, where L represents the first frequency domain bandwidth, N represents the second frequency domain bandwidth, RIV represents the value of the resource indication information, $S_0$ represents the frequency domain starting position of the first resource, and $S_1$ represents the frequency domain starting position of the second resource.

In a possible implementation, when a first value is greater than or equal to a fourth limit, the frequency domain starting position of the first resource or the frequency domain starting position of the second resource is determined using $N^2(N-L+1)$, where L represents the first frequency domain bandwidth, and N represents the second frequency domain bandwidth.

In a possible implementation, when a first value is greater than or equal to a fourth limit, the frequency domain starting position of the first resource or the frequency domain starting position of the second resource is determined using $N^2(N-L+1)+(L+1)(N-1)-RIV$.

In a possible implementation, when a first value is greater than or equal to a fourth limit, the frequency domain starting position of the first resource satisfies:

$S_0=\lfloor \{(N^2(N-L+1)+(L+1)(N-1)-RIV)/L\} \rfloor$ or $S_0=\lceil \{(N^2(N-L+1)+(L+1)(N-1)-RIV)/L\} \rceil$;

and/or the frequency domain starting position of the second resource satisfies:

$S_1=\{(N^2(N-L+1)+(L+1)(N-1)-RIV)\} \mod L$.

In a possible implementation, the first value is determined using the value of the resource indication information.

In a possible implementation, the first value is any one of the following: $\lfloor RIV/N^2 \rfloor$, $RIV/N^2$, $\lceil RIV/N^2 \rceil$, or the value of the resource indication information.

In a possible implementation, the third limit and the fourth limit in this embodiment of this application may be values pre-defined in a protocol, or may be obtained by the receiving apparatus from a third preset table, or the third limit or the fourth limit is autonomously determined by the receiving apparatus.

In a possible implementation, the third limit and the fourth limit are determined using the second frequency domain bandwidth, or the third limit and the fourth limit are determined using the second frequency domain bandwidth and the value of the resource indication information.

In a possible implementation, the third limit or the fourth limit is determined using any one of the following: $N/2$, $\lfloor N/2 \rfloor$, $\lceil N/2 \rceil$, $RIV/N^3$, or $2RIV/N^3$.

In a possible implementation, the communications module in this embodiment of this application is configured to receive any one of the following messages from the first device in the third slot: a system message, a radio resource control RRC message, downlink control information DCI, sidelink control information SCI, and a media access control MAC message, where any one of the system message, the radio resource control RRC message, the downlink control information DCI, the sidelink control information SCI, and the media access control MAC message includes the resource indication information.

For example, when the communications apparatus is a chip or a chip system used in a terminal device or the communications apparatus is used in a network device, the processing module may be a processor, and the communications module may be a communications interface. For example, the communications module may be an input/output interface, a pin, a circuit, or the like. The processing module executes instructions stored in a storage module, so that the communications apparatus implements the resource determining method according to any one of the second aspect or the possible implementations of the second aspect. The storage module may be a storage module (for example, a register or a cache) in the chip, or may be a storage module (for example, a read-only memory or a random access memory) that is in the receiving device and that is located outside the chip.

According to a fifth aspect, an embodiment of this application provides a computer-readable storage medium. The computer-readable storage medium stores instructions. When the instructions are run on a computer, the computer is enabled to perform the resource indication method according to the first aspect or the possible implementations of the first aspect.

According to a sixth aspect, this application provides a computer-readable storage medium. The computer-readable storage medium stores instructions. When the instructions are run on a computer, the computer is enabled to perform the resource determining method according to the second aspect or the possible implementations of the second aspect.

According to a seventh aspect, this application provides a computer program product including instructions. When the instructions are run on a computer, the computer is enabled to perform the resource indication method according to the first aspect or the possible implementations of the first aspect.

According to an eighth aspect, this application provides a computer program product including instructions. When the instructions are run on a computer, the computer is enabled to perform the resource determining method according to the second aspect or the possible implementations of the second aspect.

According to a ninth aspect, an embodiment of this application provides a chip. The chip includes a processor and a communications interface. The communications interface is coupled to the processor. The processor is configured to run a computer program or instructions, to implement the resource indication method according to the first aspect or the possible implementations of the first aspect. The communications interface is configured to communicate with a module other than the chip.

According to a tenth aspect, an embodiment of this application provides a chip. The chip includes a processor and a communications interface. The communications interface is coupled to the processor. The processor is configured to run a computer program or instructions, to implement the resource determining method according to the second aspect or the possible implementations of the second aspect. The communications interface is configured to communicate with a module other than the chip.

According to an eleventh aspect, an embodiment of this application provides a communications system. The communications system includes: the communications apparatus according to any one of the third aspect or the possible implementations of the third aspect, and the communications apparatus according to any one of the fourth aspect or the possible implementations of the fourth aspect.

According to a twelfth aspect, an embodiment of this application provides a communications apparatus. The communications apparatus includes one or more modules, configured to implement the methods according to the first aspect and the second aspect, and the one or more modules may correspond to the steps in the methods according to the first aspect and the second aspect.

According to a thirteenth aspect, an embodiment of this application provides a communications apparatus. The communications apparatus includes at least one processor, the at least one processor is coupled to a memory, and the processor is configured to run a computer program or instructions stored in the memory, to implement the resource indication method according to the first aspect or the possible implementations of the first aspect.

According to a fourteenth aspect, an embodiment of this application provides a communications apparatus. The communications apparatus includes at least one processor, the at least one processor is coupled to a memory, and the processor is configured to run a computer program or instructions stored in the memory, to implement the resource determining method according to the second aspect or the possible implementations of the second aspect.

The memory described in the thirteenth aspect and the fourteenth aspect of the embodiments of this application may be located inside the communications apparatus, or may be located outside the communications apparatus.

According to a fifteenth aspect, an embodiment of this application provides a communications apparatus. The communications apparatus includes at least one processor, the at least one processor is coupled to a storage medium, and the processor is configured to run a computer program or instructions stored in the storage medium, to implement the resource indication method according to the first aspect or the possible implementations of the first aspect.

According to a sixteenth aspect, an embodiment of this application provides a communications apparatus. The communications apparatus includes at least one processor, the at least one processor is coupled to a storage medium, and the processor is configured to run a computer program or instructions stored in the storage medium, to implement the resource determining method according to the second aspect or the possible implementations of the second aspect.

For beneficial effects of the second aspect to the sixteenth aspect and the implementations thereof in this application, refer to analysis of beneficial effects of the first aspect and the implementations thereof. Details are not described herein again.

DESCRIPTION OF EMBODIMENTS

Figure 1:
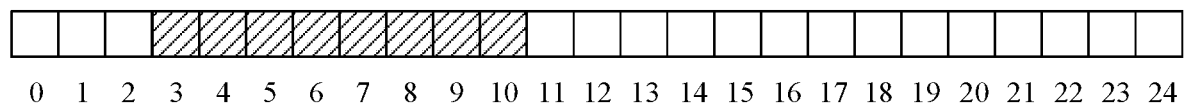
FIG. 1 is a schematic diagram of consecutive resource indications according to an embodiment of this application.

To clearly describe the technical solutions in the embodiments of this application, terms such as "first" and "second" are used in the embodiments of this application to distinguish between same items or similar items that have basically same functions and purposes. For example, a first resource and a second resource are merely intended to distinguish between different resources, and a sequence of the first resource and the second resource is not limited. A person skilled in the art may understand that the terms such as "first" and "second" do not limit a quantity or an execution sequence, and the terms such as "first" and "second" do not indicate a definite difference.

It should be noted that in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

In this application, "at least one" refers to one or more, and "a plurality of" refers to two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one of the following items (pieces)" or a similar expression thereof indicates any combination of these items, including a single item (piece) or any combination of a plurality of items (pieces). For example, at least one of a, b, or c may indicate: a; b; c; a and b; a and c; b and c; or a, b, and c; where a, b, and c may be singular or plural.

To facilitate understanding of the technical solutions in the embodiments of this application, before the embodiments of this application are described, terms used in the embodiments of this application are first described.

(1) A sidelink (SL) is a link defined for communication between terminal devices, namely, a link for communication between two terminal devices without forwarding by a network device.

(2) A sidelink resource is a resource for transmitting a sidelink service (which may also be referred to as a V2X service, and for example, may be sidelink data or sidelink signaling) on a sidelink between two terminal devices.

(3) Carriers in the embodiments of this application include a carrier in a non-carrier aggregation (CA) scenario and a component carrier (CC) in a CA scenario. The CC in the CA scenario may be a primary CC or a secondary CC, and a serving cell in the CA scenario may be a primary serving cell (PCell) or a secondary serving cell (SCell). For ease of description, in some scenarios of the embodiments of this application, the carrier in the non-CA scenario and the CC in the CA scenario may be collectively referred to as carriers. This is not specifically limited in the embodiments of this application. In addition, a part, in a carrier or in a serving cell, used for uplink transmission may be understood as an uplink resource or an uplink carrier, and a part, in the carrier or in the serving cell, used for downlink transmission may be understood as a downlink resource or a downlink carrier. For example, in a frequency division duplex (FDD) system, a frequency domain resource, in a carrier, used for uplink transmission may be understood as an uplink resource or an uplink carrier, and a frequency domain resource, in the carrier, used for downlink transmission may be understood as a downlink resource or a downlink carrier. Alternatively, for example, in a TDD system, a time domain resource, in a carrier, used for uplink transmission may be understood as an uplink resource or an uplink carrier, and a time domain resource, in the carrier, used for downlink transmission may be understood as a downlink resource or a downlink carrier.

(4) A bandwidth part (BWP) is a part of frequency domain resources in a carrier, a carrier bandwidth, or a system bandwidth allocated by a network device to a terminal device. A size of the BWP is less than or equal to a bandwidth capability of the terminal device, namely, a maximum bandwidth supported by the terminal device. In addition, the BWP is consecutive frequency domain resources. For example, the BWP may include a plurality of consecutive subcarriers. For another example, the BWP may include a plurality of consecutive physical resource blocks (PRBs). The terminal device may support a plurality of BWPs. In other words, the network device may configure a plurality of BWPs for the terminal device. When the plurality of BWPs are configured, the BWPs may overlap or may not overlap. In addition, frequency domain resources included in different BWPs may have a same subcarrier spacing or may have different subcarrier spacings.

The subcarrier spacing is a frequency domain length of a resource element (RE), and a value of the subcarrier spacing may include 15 kHz, 30 kHz, 60 kHz, or the like.

(5) A frequency domain bandwidth is a part of a carrier, a BWP, or a frequency band. The frequency domain bandwidth may be determined through signaling configuration, pre-definition, or pre-configuration. Frequency domain bandwidths may be consecutive or inconsecutive. In an optional implementation, the frequency domain bandwidth is a part of frequency domain resources configured in a resource pool, or a resource that is determined in a resource pool during communication and that is used for transmission.

(6) A resource pool is a part that includes consecutive or inconsecutive frequency domain resources and that is of a carrier or a BWP. The resource pool is usually the part including the consecutive frequency domain resources. The resource pool is configured for a plurality of terminal devices, and all the terminal devices may send and receive data in the resource pool. For a receiving end, a size of a receiving resource pool is not less than a size of a sending resource pool. Provided that a receiving terminal device can detect all resources in the receiving resource pool, the receiving terminal device can detect resources sent by all the terminal devices. A sending terminal only needs to select or determine a transmission resource of the sending terminal from the sending resource pool, to ensure that the sending terminal can correctly communicate with a receiver. In addition, optionally, the resource pool may be configured in a BWP or a carrier by using signaling, and subcarrier spacings in the resource pool are the same. Optionally, a difference between the resource pool and the BWP lies in that the resource pool is a resource of software or baseband signaling, and does not directly relate to a radio frequency; while the BWP directly affects a radio frequency bandwidth for reception and transmission.

(7) A subband is a part of consecutive or inconsecutive frequency domain resources in a resource pool. For example, the subband is a frequency domain resource including five consecutive resource blocks (RBs), six RBs, 10 RBs, or 20 RBs. A size of the subband may be configured or pre-defined. A purpose of defining the subband is for a unit of a minimum transmission resource required by ensuring communication, and is also conducive to reducing a quantity of bits of resource control signaling. For example, if a terminal device occupies a resource including 100 RBs, 100 bits are required when a bitmap is used for indication. If the resource including 100 RBs is divided into 10 subbands, and a size of each subband is 10 RBs, only 10 bits are required. In this way, overheads of the control signaling are greatly reduced.

Frequency domain resource indications are classified into consecutive frequency domain resource indications and distributed resource indications. The consecutive resource indications indicate a frequency domain starting position (which may also be referred to as a frequency domain start point or a frequency domain start position) and a length of a frequency domain resource within a bandwidth, or indicate a frequency domain starting position and a frequency domain end point position (which may also be referred to as a frequency domain ending position or a frequency domain end point) of a frequency domain resource. As shown in FIG. 1, the frequency domain starting position that is of the frequency domain resource and that is indicated by the consecutive resource indications is a frequency domain resource 3, and a length is 8. In this case, a receiving device may determine that frequency domain resources selected by a transmitting device are the frequency domain resource 3 to a frequency domain resource 10.

The distributed resource indications may indicate allocated frequency domain resources in a consecutive or inconsecutive manner at all positions in a bandwidth. For example, a bit sequence (which may also be referred to as a bitmap) is used to indicate inconsecutive frequency domain resources in the bandwidth. Each bit in the bit sequence is associated with at least one frequency domain resource, and each bit may correspond to a first indicator or a second indicator. That one bit corresponds to the first indicator indicates that at least one frequency domain resource associated with the bit is selected. That one bit corresponds to the second indicator indicates that at least one frequency domain resource associated with the bit is not selected.

Figure 2:
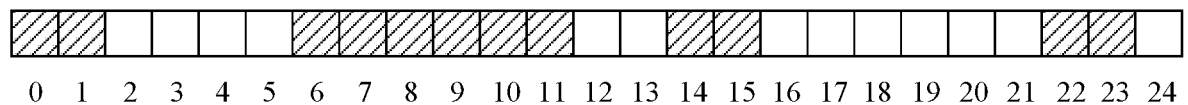
FIG. 2 is a schematic diagram of distributed resource indications according to an embodiment of this application.

For example, the first indicator may be "1", and the second indicator may be "2". As shown in FIG. 2, an example in which a bit sequence is "1001110100010", and each bit is associated with two consecutive frequency domain resources is used. In this case, a transmitting device may indicate, to a receiving device by using "1001110100010", that frequency domain resources selected by the transmitting device include a frequency domain resource 0, a frequency domain resource 1, a frequency domain resource 8 to a frequency domain resource 11, a frequency domain resource 14, a frequency domain resource 15, a frequency domain resource 22, and a frequency domain resource 23.

For the consecutive frequency domain resource indications in FIG. 1, during signaling indication, a corresponding method is required for indicating signaling indicating a starting position and an end point position of a frequency domain resource. Currently, the starting position and the end point position of the frequency domain resource may be indicated by using the following formula:

if $$(P-1) \le \left\lceil \frac{N}{2} \right\rceil,$$

x=N(P−1)+O; otherwise, x=N(N−(P−1))+(N−1−O), where N is a quantity of PRBs in a bandwidth. A value χ of RIV is indicated by using an indication field of the frequency domain resource, and then a receiving device can calculate a frequency domain start point O of the frequency domain resource and a length P of the frequency domain resource according to the formula defined above.

Further, according to the foregoing formula of RIV, a current technology provides a method for calculating values of the foregoing parameters:

$$a = \left\lfloor \frac{x}{N} \right\rfloor + 1,$$

and b=x mod N; and if $$(a+b) > N, \begin{Bmatrix} P = N + 2 - a \\ O = N - 1 - b \end{Bmatrix};$$

otherwise, $$\begin{Bmatrix} P = a \\ O = b \end{Bmatrix}.$$

Although the method may be used to indicate a frequency domain position in a subframe, the method cannot be used to implement a case in which one field is used to indicate two different frequency domain resources. To indicate two different frequency domain resources by using one field, the embodiments of this application provide an embodiment of interaction that is between a resource indication method and a resource determining method and that is described in FIG. 5.

Figure 3:
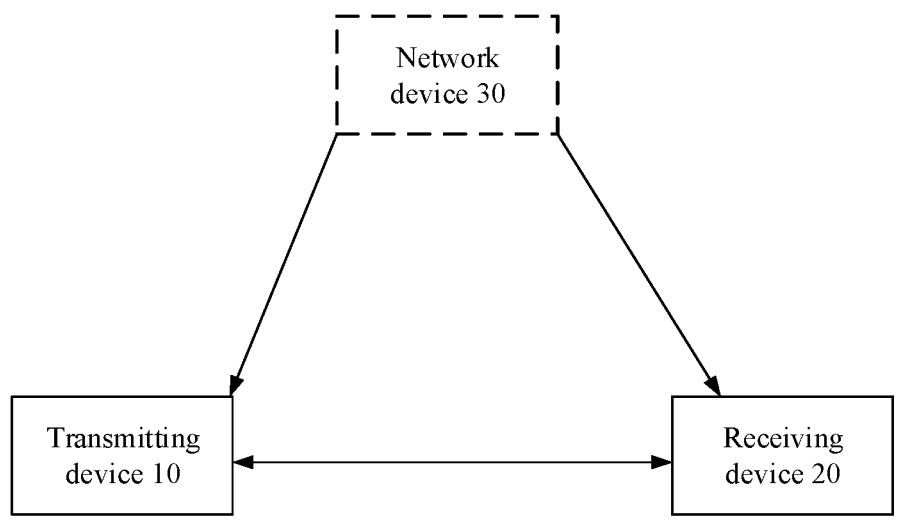
FIG. 3 is a schematic architectural diagram of a communications system according to an embodiment of this application.

FIG. 3 shows a communications system to which a resource indication method and a resource determining method are applicable according to an embodiment of this application. The communications system includes one or more transmitting devices 10 and one or more receiving devices 20. In FIG. 3, one transmitting device 10 and one receiving device 20 are used as an example.

This embodiment of this application describes the embodiments with reference to the transmitting device 10 and the receiving device 20. On the one hand, the transmitting device 10 may be one of a network device and a terminal device, and the receiving device 20 may be the other one of the network device and the terminal device. Alternatively, on the other hand, both the transmitting device 10 and the receiving device 20 are terminal devices.

For Example, Scenario 1: Cellular Link

The transmitting device 10 may be a network device, and the receiving device 20 may be a terminal device. Alternatively, the transmitting device 10 may be a terminal device, and the receiving device 20 may be a network device. In the scenario 1, there is a first transmission link between the receiving device 20 and the transmitting device 10. The first transmission link may be referred to as an air interface link or a Uu link.

Scenario 2: Relay (Backhaul) Link

The transmitting device 10 may be a first-type base station, and the receiving device 20 may be a second-type base station. Alternatively, the transmitting device 10 may be a second-type base station, and the receiving device 20 may be a first-type base station. The first-type base station and the second-type base station may be of a same type, for example, may be both macro base stations, small cells, micro base stations, primary cells, or secondary cells. Alternatively, the first-type base station and the second-type base station may be different base stations or cells in a macro base station, a small cell, a micro base station, a primary cell, and a secondary cell. In this case, a first transmission link between the transmitting device 10 and the receiving device 20 may be referred to as a backhaul link. The backhaul link is a radio link used for communication between a node and a parent node of the node, and includes an uplink transmission link and a downlink transmission link. Uplink transmission on the backhaul link is also referred to as uplink transmission of the backhaul link, and downlink transmission on the backhaul link is also referred to as downlink transmission of the backhaul link. The node includes but is not limited to the IAB node. The first-type base station and the second-type base station may be base stations of different subtypes.

Scenario 3: V2X Scenario

Both the transmitting device 10 and the receiving device 20 may be terminal devices. In this case, a first transmission link between the transmitting device 10 and the receiving device 20 may be referred to as a sidelink. In this scenario, the transmitting device 10 and the receiving device 20 may be user equipments or network devices of a same type, or may be a road side unit (RSU) and a user terminal. In other words, the transmitting device 10 is a terminal device, and the receiving device 20 is another terminal device. Alternatively, the transmitting device 10 is an RSU, and the receiving device 20 is a terminal device. Alternatively, the transmitting device 10 is a terminal device, and the receiving device 20 is an RSU. In addition, the sidelink may alternatively be a link between base station devices of a same type or different types. In this case, a function of the sidelink is similar to that of a relay link, but an air interface technology used by the sidelink may be the same as or different from that used by the relay link.

In an optional implementation, in the V2X scenario, the communications system may further include a network device 30. The network device 30 is configured to configure transmission parameters for the transmitting device 10 and the receiving device 20. For example, the transmission parameter may include configuration information of a resource pool, and indication information of a sidelink resource used for sidelink transmission, for example, a size of a sub-channel of a data channel and/or a size of a sub-channel of a control channel that are/is configured in the resource pool, a quantity of sub-channels, a quantity of symbols of the control channel, a reference signal pattern used during data transmission, or a power parameter used during transmission.

In the following, some terms of the embodiments of this application are described, to help a person skilled in the art have a better understanding.

(8) A terminal apparatus may be a terminal device, or a chip or another component that is disposed in a terminal device and that can implement a function of the terminal device. The terminal device includes a device that provides a voice and/or data connectivity for a user. Specifically, the terminal device includes a device that provides a voice for a user, or includes a device that provides data connectivity for a user, or includes a device that provides a voice and data connectivity for a user. For example, the terminal device may include a handheld device having a wireless connection function, or a processing device connected to a wireless modem. The terminal device may communicate with a core network through a radio access network (RAN), and exchange a voice or data with the RAN, or exchange a voice and data with the RAN. The terminal device may include a user equipment (UE), a wireless terminal device, a mobile terminal device, a device-to-device (D2D) communication terminal device, a vehicle-to-everything (V2X) terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may be an information sensing device, for example, a barcode identification device, radio frequency identification (RFID) device, a sensor, a global positioning system (GPS), or a laser scanner.

By way of example, and not limitation, in the embodiments of this application, the terminal device may alternatively be a wearable device. The wearable device may also be referred to as a wearable intelligent device, an intelligent wearable device, or the like, and is a generic term for wearable devices, such as glasses, gloves, watches, clothes, and shoes, that are developed by applying wearable technologies to intelligently designs of daily wear. The wearable device is a portable device that can be directly worn by a user or integrated into clothes or an accessory of a user. The wearable device is not merely a hardware device, but is configured to implement a powerful function through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application functions and need to work with other devices such as smartphones.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBUs).

In the embodiments of this application, any device that can perform data communication with a base station may be considered as a terminal device.

(9) A Network device includes, for example, an access network (AN) device such as a base station (for example, an access point), and may be a device that communicates with a wireless terminal device over an air interface through one or more cells in an access network. Alternatively, for example, a network device in a V2X technology is a road side unit (RSU). The base station may be configured to mutually convert a received over-the-air frame and an IP packet, and serve as a router between the terminal device and a remaining part of the access network. The remaining part of the access network may include an IP network. The RSU may be a fixed infrastructure entity supporting application of the V2X, and may exchange a message with another entity supporting application of the V2X. The network device may further coordinate attribute management of the air interface. For example, the network device may include an evolved NodeB (NodeB, eNB, or e-NodeB, evolutional NodeB) in an LTE system or a long term evolution-advanced (LTE-A) system, or may include a next generation NodeB (gNB) in a 5G new radio (NR) system (which is also referred to as an "NR system"), or may include a centralized unit (CU) and a distributed unit (DU) in a cloud radio access network (Cloud RAN) system. This is not limited in the embodiments of this application.

The network device may further include a core network device. However, because the embodiments of this application mainly relate to an access network device, a network device mentioned below may refer to an access network device unless otherwise specified.

(10) Vehicle-to-everything (V2X) means that a vehicle is connected to and communicates with the outside, and is a basic and key technology of future smart vehicles, automatic driving, and intelligent transport systems. On a basis of an existing D2D technology, a specific application requirement of the V2X is to be optimized in the V2X, to further reduce an access delay of a V2X device and resolve a resource conflict problem.

The V2X specifically further includes several application requirements such as vehicle-to-vehicle (V2V), vehicle-to-infrastructure (V2I), and vehicle-to-pedestrian (V2P) direct communication, and vehicle-to-network (V2N) communication interaction. As shown in FIG. 2, V2V refers to communication between vehicles. V2P refers to communication between a vehicle and a person (including a pedestrian, a bicycle rider, a driver, or a passenger). V2I refers to communication between a vehicle and a network device, for example, an RSU. In addition, another type of V2N may be included in the V2I. The V2N refers to communication between a vehicle and a base station/network.

The V2P may be used for safety warning for a pedestrian or anon-motor vehicle on a road. A vehicle may communicate, through the V2I, with a road or even another infrastructure such as a traffic light or a road barrier, to obtain road management information such as a traffic light signal time sequence. The V2V may be used for information exchange and reminding between vehicles, and a most typical application is an anti-collision safety system between vehicles. The V2N is currently the most widely used form of an internet of vehicles, and a main function of the V2N is to enable a vehicle to connect to a cloud server through a mobile network, so as to use an application function, such as navigation, entertainment, or anti-theft, provided by the cloud server.

(11) In a case of a normal cyclic prefix, one slot in an NR system includes 14 OFDM symbols. In a case of an extended cyclic prefix, one slot in an NR system includes 12 OFDM symbols. For example, a slot length corresponding to a subcarrier spacing of 15 kHz is 1 ms, a slot length corresponding to a subcarrier spacing of 30 kHz is 0.5 ms, a slot length corresponding to a subcarrier spacing of 60 kHz is 0.25 ms, and a slot length corresponding to a subcarrier spacing of 120 kHz is 0.125 ms.

(12) Configuration, pre-configuration, and pre-definition. In the embodiments of this application, the configuration is used in some places, the pre-configuration is used in some places, and the pre-definition is used in some places. In the embodiments of this application, it is considered that when one of the configuration, the pre-configuration, and the pre-definition appears, the one of the configuration, the pre-configuration, and the pre-definition may further have the other two functions. The configuration usually refers to a manner in which when there is a network device, a communication resource or a communication parameter is set or modified by using a transmitted message. The pre-configuration usually refers to a parameter that is written in a communications device in advance when there is no network device. The pre-definition usually refers to a method or a rule of working in an agreed manner or according to a protocol, and the method or the rule may be a formula, a function, a constraint condition, a table, or the like in the protocol.

The terms "system" and "network" may be interchangeably used in the embodiments of this application.

A method and an apparatus that are provided in the embodiments of this application may be used in a terminal device or a network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). An operating system may be any one or more computer operating systems, for example, a Linux operating system, a Unix operating system, an Android operating system, an iOS operating system, or a Windows operating system, that implement service processing through a process. The application layer includes applications such as a browser, an address book, word processing software, and instant messaging software. In addition, in the embodiments of this application, a specific structure of an entity for performing the method is not specially limited in the embodiments of this application, provided that the entity can run a program that records code of the signal transmission method in the embodiments of this application, to perform communication according to the signal transmission method in the embodiments of this application. For example, a wireless communication method in the embodiments of this application may be performed by a terminal device or a network device, or a function module that is in a terminal device or a network device and that can invoke a program and execute the program.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

Figure 4:
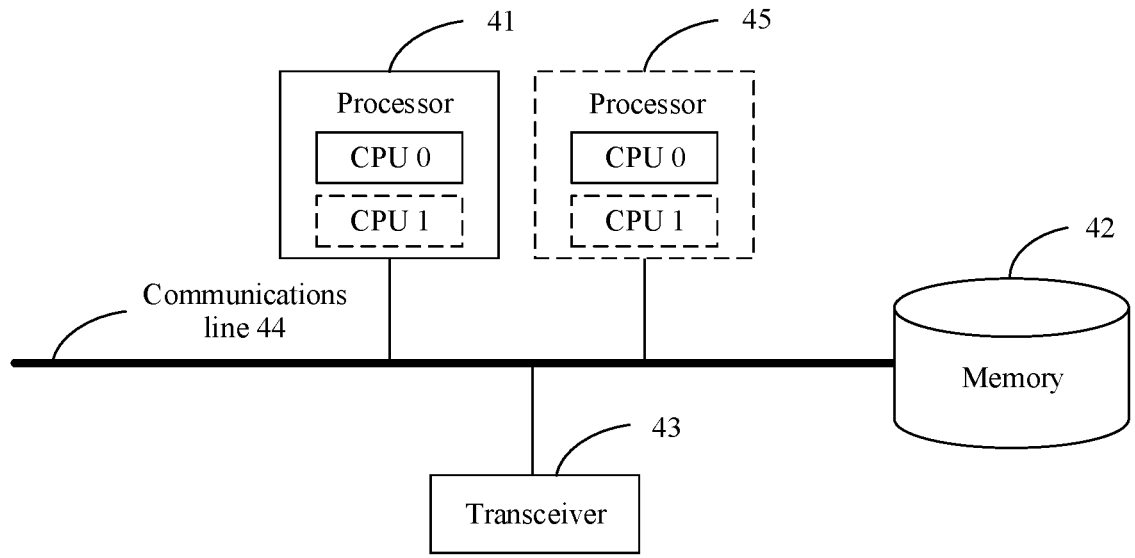
FIG. 4 is a schematic structural diagram of a communications device according to an embodiment of this application.

FIG. 4 is a schematic diagram of a hardware structure of a communications device according to an embodiment of this application. For structures of a transmitting device 10 and a receiving device 20 in the embodiments of this application, refer to the structure shown in FIG. 4. The communications device includes a processor 41, a communications line 44, and at least one communications interface (FIG. 4 is described merely by using an example in which the communications device includes a transceiver 43).

Optionally, the communications device may further include a memory 42.

The processor 41 may be a general-purpose central processing unit (CPU), a microprocessor, an application-specific integrated circuit (ASIC), or one or more integrated circuits configured to control program execution of the solutions of this application.

The communications line 44 may include a path for transferring information between the foregoing components.

The transceiver 43 is configured to exchange information with another apparatus. For example, the transceiver 43 may use any apparatus of a transceiver type, and is configured to communicate with another device or a communications network, for example, an ethernet, a radio access network (RAN), or a wireless local area network (WLAN).

The memory 42 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can is accessible by a computer. However, the memory 42 is not limited thereto. The memory may exist independently, and is connected to the processor through the communications line 44. Alternatively, the memory may be integrated with the processor.

The memory 42 is configured to store computer-executable instructions for performing the solutions in this application, and the processor 41 controls execution of the computer-executable instructions. The processor 41 is configured to execute the computer-executable instructions stored in the memory 42, to implement a resource indication method or a resource determining method provided in the following embodiments of this application.

Optionally, the computer-executable instructions in the embodiments of this application may also be referred to as application program code. This is not specifically limited in the embodiments of this application.

During specific implementation, in an embodiment, the processor 41 may include one or more CPUs, for example, a CPU 0 and a CPU 1 in FIG. 4.

During specific implementation, in an embodiment, the communications device may include a plurality of processors, for example, the processor 41 and a processor 45 in FIG. 4. Each of the processors may be a single-core (single-CPU) processor or a multi-core (multi-CPU) processor. The processor herein may be one or more devices, circuits, and/or processing cores configured to process data (for example, computer program/instructions).

In the embodiments of this application, specific structures of entities for performing a resource indication method and a resource determining method are not particularly limited in the embodiments of this application, provided that a program that records code of the resource indication method in the embodiments of this application can be run, to perform communication according to the resource indication method in the embodiments of this application, and a program that records code of the resource determining method in the embodiments of this application can be run, to perform communication according to the resource determining method in the embodiments of this application. The following embodiment is described by using an example in which a resource indication method is performed by a transmitting apparatus, and a resource determining method is performed by a receiving apparatus.

It should be noted that mutual reference may be made between the embodiments of this application. For example, for same or similar steps, mutual reference may be made between method embodiments, apparatus embodiments, or system embodiments. This is not limited.

Figure 5:
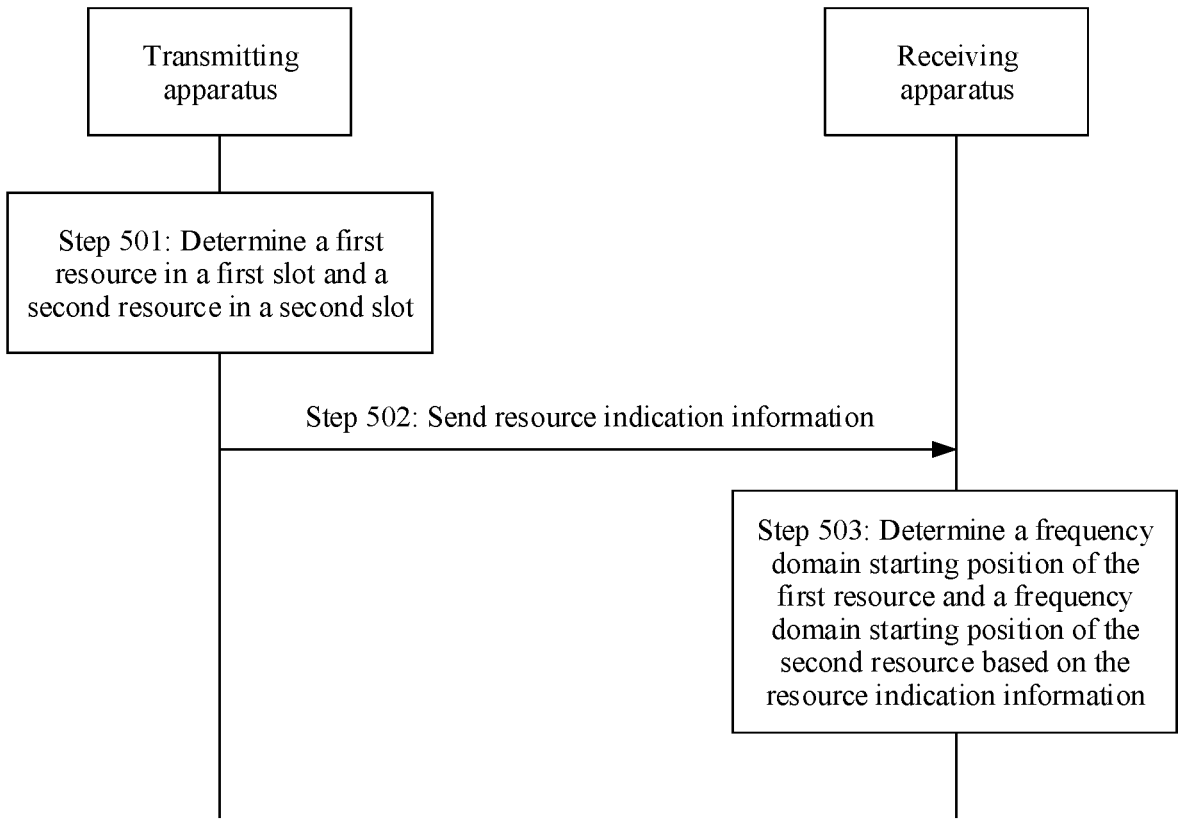
FIG. 5 is a schematic interactive diagram of a resource indication method and a resource determining method according to an embodiment of this application.

Referring to FIG. 5, the embodiments of this application provide an embodiment of interaction between a resource indication method and a resource determining method. The method includes the following steps.

Step 501: A transmitting apparatus determines a first resource in a first slot and a second resource in a second slot, where the first resource and the second resource are used to send data.

For example, the transmitting apparatus may be the transmitting device 10 shown in FIG. 1, or the transmitting apparatus may be a function module that is in the transmitting device 10 and that can invoke and execute a program, or may be an apparatus, for example, a chip, used in the transmitting device 10.

It may be understood that, that the first resource and the second resource are used to send data indicates that the transmitting apparatus may send data on the first resource and the second resource. However, the transmitting apparatus may send data on the first resource and the second resource, or may not send data on the first resource and the second resource.

The first slot and the second slot in this embodiment of this application may be consecutive slots or inconsecutive slots.

A slot in the embodiments of this application may be a resource separately used for communication. For example, in a TDM system, different slots are used for communication performed by a same terminal device or different terminal devices.

Optionally, a resource in a slot may be a complete slot, or may be one or more symbols or a subslot including a plurality of symbols in the slot. This is not limited in the embodiments of this application. A slot in the embodiments of this application may be referred to as a time unit or a subframe, or may be another time unit.

Step 502: The transmitting apparatus sends resource indication information in a third slot, and correspondingly, a receiving apparatus receives the resource indication information from the transmitting apparatus in the third slot.

A value of the resource indication information is used to indicate a frequency domain position of the first resource and a frequency domain position of the second resource.

In this embodiment of this application, the second slot and the first slot are later than the third slot. In other words, the third slot is located before the first slot and the second slot, or the third slot is earlier than the first slot and the second slot.

In this embodiment of this application, the first slot and the third slot may be consecutive slots or inconsecutive slots, or the second slot and the third slot may be consecutive slots or inconsecutive slots.

In a possible implementation, the frequency domain position of the first resource may alternatively be replaced with a code domain position of the first resource or a space domain position of the first resource. The frequency domain position of the second resource may alternatively be replaced with a code domain position of the second resource or a space domain position of the second resource. The frequency domain position of the first resource is the same as or different from the frequency domain position of the second resource. It should be understood that, if the first resource and the second resource are located in a same slot, a frequency domain starting position of the first resource is definitely different from a frequency domain starting position or a frequency domain ending position of the second resource. Therefore, the frequency domain position of the first resource is different from the frequency domain position of the second resource. If the first resource and the second resource are located in different slots (for example, the first slot and the second slot are different), a frequency domain starting position of the first resource may be the same as a frequency domain starting position or a frequency domain ending position of the second resource. Therefore, the frequency domain position of the first resource is the same as the frequency domain position of the second resource.

In a possible implementation, the first resource and the second resource are resources in time domain, resources in frequency domain, resources in code domain, or resources in space domain.

For example, the receiving apparatus may be the receiving device 20 shown in FIG. 1, or the receiving apparatus may be a function module that is in the receiving device 20 and that can invoke and execute a program, or may be an apparatus, for example, a chip, used in the receiving device 20.

It may be understood that, for the receiving apparatus, the first resource and the second resource are candidate sending resources of the transmitting apparatus. In other words, the receiving apparatus may determine that the first resource and the second resource are resources selected by the transmitting apparatus for sending data.

In an example, if both the transmitting apparatus and the receiving apparatus are terminal apparatuses, the first resource and the second resource may be sidelink resources, and the sidelink resource is used to transmit a sidelink service.

In another example, if the transmitting apparatus is a terminal apparatus, and the receiving apparatus is a network device or a chip used in a network device; or if the transmitting apparatus is a network device or a chip used in a network device, and the receiving apparatus is a terminal apparatus, the first resource and the second resource may be transmission resources (for example, air interface resources) between the network device and the terminal device, and the air interface resource is used to transmit an uplink service (for example, uplink signaling or uplink data) or a downlink service (for example, downlink signaling or downlink data) between the terminal device and the network device.

For example, the value of the resource indication information may be a resource indication value (RIV).

In a possible implementation, the third slot is a slot for sending the resource indication information, the resource indication information is carried in first-level SCI in the third slot, the second slot and the first slot are slot positions indicated in the first-level SCI, and the second slot and the first slot are different slots or a same slot in a pre-defined or configured time window.

In a possible implementation, a size of the pre-defined or configured time window is 32 slots, and the time window includes the third slot, the first slot, the second slot, and the third slot.

Step 503: The receiving apparatus determines the frequency domain starting position of the first resource and the frequency domain starting position of the second resource based on the resource indication information.

This embodiment of this application provides the resource indication method. According to the method, the first resource in the first slot and the second resource in the second slot are determined, and the resource indication information is sent, where the value of the resource indication information may indicate the frequency domain position of the first resource and the frequency domain position of the second resource. Therefore, a receiving end (for example, the receiving apparatus) may determine the frequency domain positions of the two resources (for example, the first resource and the second resource) selected by a transmitting end (for example, the transmitting apparatus) based on the value of the resource indication information. Compared with using identifiers of the resources to indicate the positions of the resources, using the value of the resource indication information to indicate the positions of the two resources selected by the transmitting apparatus can further reduce signaling overheads.

In a possible implementation, the first resource and the second resource in this embodiment of this application may belong to a same resource set, or may belong to different resource sets.

In a possible implementation, the resource set includes any one of a resource pool, a carrier, a bandwidth part, and a subband.

In a possible implementation, the frequency domain position of the first resource includes one or more of the frequency domain starting position, a frequency domain ending position, or a frequency domain middle position of the first resource, or a position indicated by signaling; and the frequency domain position of the second resource includes one or more of the frequency domain starting position, the frequency domain ending position, or a frequency domain middle position of the second resource, or a position indicated by signaling. In this embodiment of this application, the first resource may be a resource in a first resource set, and the second resource may be a resource in a second resource set. For example, the first resource set and the second resource set may be a same resource set, or may be different resource sets.

The position indicated by the signaling is a position that is of the resource and that is pre-configured by the network device or that is configured in a resource pool in which the resource is located.

In this embodiment of this application, the frequency domain position of the first resource may be determined and indicated by using the frequency domain starting position of the first resource and a length of a frequency domain bandwidth of the first resource; or the frequency domain position of the first resource may be determined and indicated by using the frequency domain starting position and the frequency domain ending position of the first resource; or the frequency domain position of the first resource may be determined and indicated by using the frequency domain middle position of the first resource and a length of a frequency domain bandwidth of the first resource. This is not limited in this embodiment of this application. For descriptions of the frequency domain position of the second resource, refer to the descriptions of the frequency domain position of the first resource. Details are not described below again.

In a possible implementation, the frequency domain bandwidth of the first resource is the same as a frequency domain bandwidth of the second resource.

Example (1-1): V2X Scenario

In a possible implementation, step 501 in this embodiment of this application may be implemented in the following manner: The transmitting apparatus receives a first message (for example, a system message or dedicated signaling) from the network device, where the first message is used to indicate to configure information about the first resource and information about the second resource for the transmitting apparatus. This manner may also be referred to as a resource allocation manner based on scheduling performed by the network device. The information about the first resource may be used to determine the first resource in the first slot. For example, the information about the first resource may be an identifier of the first resource, or the frequency domain starting position of the first resource and the frequency domain bandwidth of the first resource, or the frequency domain starting position and the frequency domain ending position of the first resource. The information about the second resource may be an identifier of the second resource, or the frequency domain starting position of the second resource and the frequency domain bandwidth of the second resource, or the frequency domain starting position and the frequency domain ending position of the second resource.

In another possible implementation, step 501 in this embodiment of this application may be implemented in the following manner: The transmitting apparatus selects the first resource from the first resource set, to determine the first resource, and selects the second resource from the second resource set, to determine the second resource. This manner may also be referred to as an allocation manner in which the transmitting apparatus autonomously selects the resources from resource sets, that is, the transmitting apparatus autonomously selects the resources from the first resource set and the second resource set that are configured or pre-configured by the network device by using a system message or dedicated signaling, to transmit sidelink data or sidelink signaling on the autonomously selected resources.

The first resource set and the second resource set in this embodiment of this application may be specially configured by the network device for the transmitting apparatus. In this case, only the transmitting apparatus may select resources from the first resource set and the second resource set; or the first resource set and the second resource set are shared resource sets or common resource sets, that is, a device other than the transmitting apparatus may also select resources from the first resource set and the second resource set.

Example (1-2): Cellular Link Scenario

In still another possible implementation, if the transmitting apparatus is a terminal apparatus, and the receiving apparatus is a network device or a chip used in a network device, step 501 in this embodiment of this application may be implemented in the following manner: The transmitting apparatus determines the first resource from the first resource set, and determines the second resource from the second resource set. That is, the first resource set and the second resource set may be pre-configured by the receiving apparatus for the transmitting apparatus, or pre-defined in a protocol. When the transmitting apparatus needs to send uplink data or uplink signaling to the receiving apparatus, the transmitting apparatus may determine the first resource from the first resource set, and determine the second resource from the second resource set.

In a possible implementation, step 502 in this embodiment of this application may be implemented in the following manner: The transmitting apparatus sends a second message to the receiving apparatus, and correspondingly, the receiving apparatus receives the second message from the transmitting apparatus. The second message carries the resource indication information.

For example, the second message may be any one of the following messages: a system message, a radio resource control (RRC) message, downlink control information (DCI), sidelink control information (SCI), and a media access control (MAC) message.

If the transmitting apparatus is a network device or a chip used in a network device, and the receiving apparatus is a terminal apparatus, the second message is a system message, an RRC message, a MAC message, or DCI. If both the transmitting apparatus and the receiving apparatus are terminal apparatuses, the second message is SCI, an RRC message between the terminal devices, or a MAC message between the terminal devices.

In a possible implementation, the resource in this embodiment of this application may be any one or more of a frequency domain resource, a time domain resource, a space domain resource, and a code domain resource. Using an example in which the resource is a frequency domain resource, the first resource may be a first frequency domain resource, and the second resource may be a second frequency domain resource.

When the first resource and the second resource are frequency domain resources, a unit of the frequency domain resource may be a subcarrier, an RB, a sub-channel, a resource pool, a BWP, or a carrier. When the first resource and the second resource are time domain resources, a unit of the time domain resource may be a symbol, a symbol set, a sub-slot, a slot, a subframe, or the like. When the first resource and the second resource are space domain resources, a unit of the space domain resource may be a beam direction, a precoding vector, or a space layer. When the first resource and the second resource are code domain resources, a unit of the code domain resource may be a sequence, a different code channel, a root sequence number of a sequence, a cyclic shift of a sequence, an orthogonal mask of a sequence, or the like.

Example 2-1

The transmitting apparatus is a network device or a chip used in a network device, and the receiving device 20 is a terminal apparatus On the one hand, when the first resource and the second resource may be air interface resources, in an example, the resource indication information is used to indicate, to the receiving apparatus, the frequency domain position of the first resource and the frequency domain position of the second resource, where the first resource and the second resource are allocated by the transmitting apparatus to the receiving apparatus, so that the receiving apparatus may subsequently send an uplink service to the transmitting apparatus on the first resource and the second resource; and in another example, the transmitting apparatus may indicate, by using the resource indication information, the receiving apparatus to receive a downlink service from the transmitting apparatus on the first resource and the second resource. This is because the transmitting apparatus may configure a plurality of resources (including the first resource and the second resource) for the receiving apparatus, and the resource indication information may be used to enable the receiving apparatus to determine that the downlink service from the transmitting apparatus is carried on the first resource and the second resource. In this way, unnecessary overheads caused by retrieving the downlink service on the plurality of resources by the receiving apparatus can be avoided.

On the other hand, when the first resource and the second resource may be sidelink resources configured by the transmitting apparatus for the receiving apparatus, in an example, the resource indication information is used to indicate, to the receiving apparatus, the frequency domain position of the first resource and the frequency domain position of the second resource, where the first resource and the second resource are allocated by the transmitting apparatus to the receiving apparatus, so that the receiving apparatus may subsequently send a sidelink service to another terminal device on the first resource and the second resource.

Example 2-2

The transmitting apparatus is a terminal device, and the receiving apparatus is a network device or a chip used in a network device.

On the one hand, when the first resource and the second resource may be air interface resources, in an example, the resource indication information is used to indicate, to the receiving apparatus, the frequency domain position of the first resource and the frequency domain position of the second resource, where the first resource and the second resource are selected by the transmitting apparatus, and are used to carry uplink data or uplink signaling, so that it is convenient for the receiving apparatus to determine a position of a resource for receiving an uplink service.

Example 2-3

Both the transmitting apparatus and the receiving apparatus are terminal apparatuses.

In an example, the resource indication information is used to indicate the receiving apparatus to receive a sidelink service from the transmitting apparatus on the first resource and the second resource.

In another example, the resource indication information is used to indicate, to the receiving apparatus, that the first resource and the second resource have been selected by the transmitting apparatus. This solution may be applicable to a scenario in which the transmitting apparatus and the receiving apparatus obtain a sidelink resource in a contention manner. In this way, when subsequently obtaining the sidelink resource in the contention manner, the receiving apparatus may avoid using the first resource and the second resource.

Based on the foregoing descriptions, the resource indication information in this embodiment of this application is further used to indicate that the first resource and the second resource are resources occupied by data (for example, an uplink service/a downlink service/a sidelink service) sent by the transmitting apparatus. Alternatively, the resource indication information is further used to indicate that the first resource and the second resource are reserved resources selected by the transmitting apparatus. Alternatively, the resource indication information is further used to assist the receiving apparatus in determining an available resource.

Both the candidate resource and the reserved resource may be used by the transmitting apparatus to send data.

The reserved resource in this embodiment of this application may be used by the transmitting apparatus to send a retransmitted service or a newly transmitted service. The newly transmitted service is a service transmitted for the first time. The retransmitted service is a service that is transmitted for a plurality of times. In other words, the retransmitted service is a service that is sent by the transmitting apparatus and that is not sent for the first time. The first resource and the second resource in this embodiment of this application may be used to send a retransmitted service or a newly transmitted service. It may be understood that, regardless of whether the receiving apparatus is a network device or a terminal device, to ensure that a data packet sent by the transmitting apparatus can be correctly received by the receiving apparatus, after the transmitting apparatus selects a third resource for sending a first data packet, the transmitting apparatus may further select the first resource and the second resource as reserved resources. When the first data packet is not correctly received, or is not successfully decoded, or is not successfully parsed, the transmitting apparatus may retransmit the first data packet by using the first resource and the second resource. When the first data packet is correctly received, or is successfully decoded, or is successfully parsed, the transmitting apparatus may transmit a second data packet and a third data packet by using the first resource and the second resource. In this case, the second data packet and the third data packet may be considered as retransmitted services.

Based on this, the method provided in this embodiment of this application may further include: sending, by the transmitting apparatus, the first data packet on the third resource in the third slot, sending the second data packet on the first resource, and sending the third data packet on the second resource, where the second data packet and the third data packet are different from the first data packet, or the second data packet and the third data packet are retransmitted data packets of the first data packet.

Figure 6:
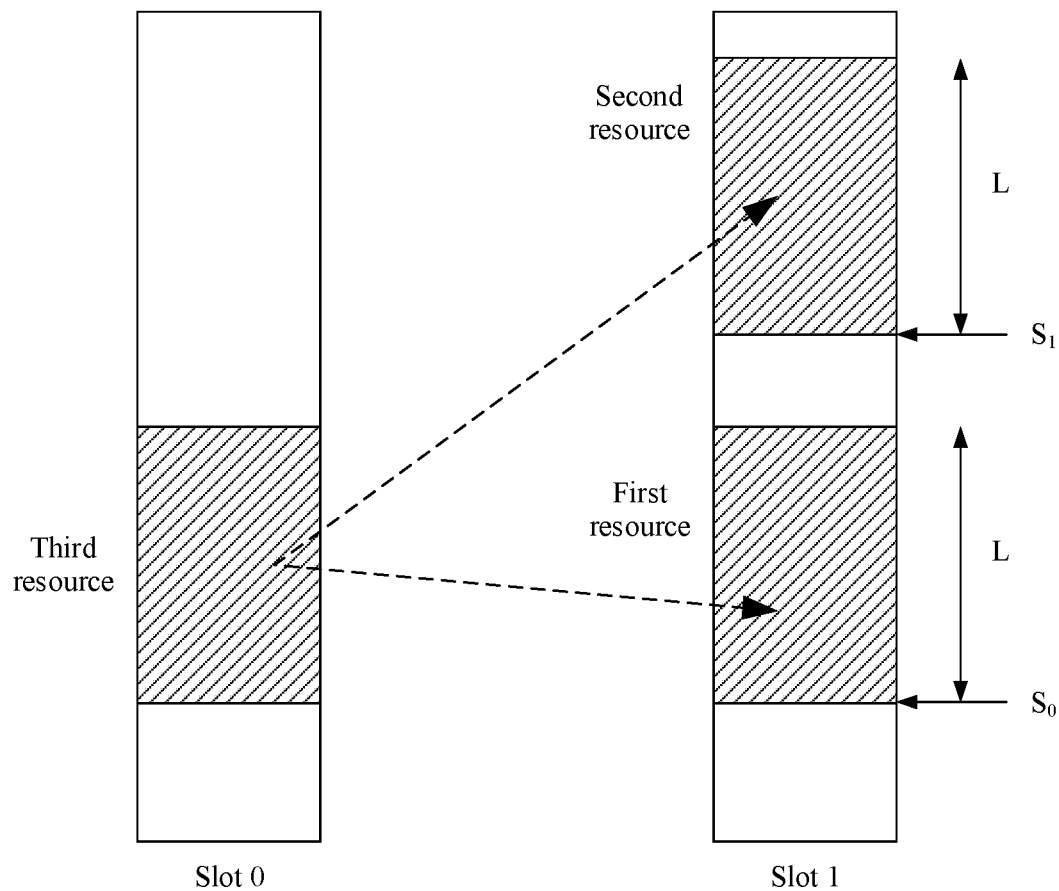
FIG. 6 is a schematic diagram in which a first resource and a second resource are located on a same time domain resource according to an embodiment of this application.

In a possible implementation, the first slot and the second slot in this embodiment of this application may be a same slot. In other words, the first resource and the second resource are located in a same slot, or the first resource and the second resource are resources in a same slot. As shown in FIG. 6, in a slot 0 (corresponding to the third slot), the transmitting apparatus indicates, to the receiving apparatus by using the resource indication information, the frequency domain position of the first resource located in a slot 1 (corresponding to the first slot) and the frequency domain position of the second resource located in a slot 2. It should be noted that when the first resource and the second resource correspond to a same slot, the first resource and the second resource may be consecutive resources, or may be inconsecutive resources. In FIG. 6, an example in which the first resource and the second resource are inconsecutive resources is used.

Figure 7:
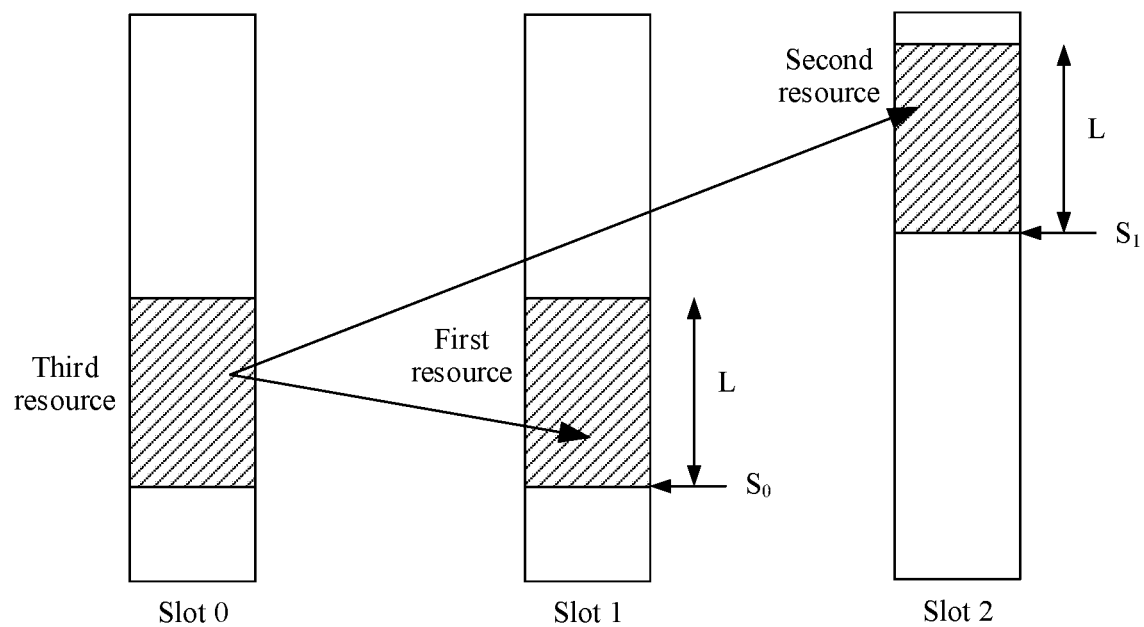
FIG. 7 is a schematic diagram in which a first resource and a second resource are located on different time domain resources according to an embodiment of this application.

In another possible implementation, the first slot and the second slot in this embodiment of this application are different slots. In other words, the first resource and the second resource are resources in different slots. For example, as shown in FIG. 7, in a slot 0 (corresponding to the third slot), the transmitting apparatus indicates, to the receiving apparatus by using the resource indication information, the frequency domain position of the first resource located in a slot 1 and the frequency domain position of the second resource located in a slot 2. It should be noted that, when the first resource and the second resource correspond to different slots, the frequency domain position of the first resource and the frequency domain position of the second resource may be the same (for example, the frequency domain starting position of the first resource is the same as the frequency domain starting position of the second resource). Alternatively, the frequency domain position of the first resource and the frequency domain position of the second resource may be different (for example, the frequency domain starting position of the first resource is different from the frequency domain starting position of the second resource). In FIG. 7, an example in which the first resource and the second resource have different frequency domain positions is used.

Figure 8:
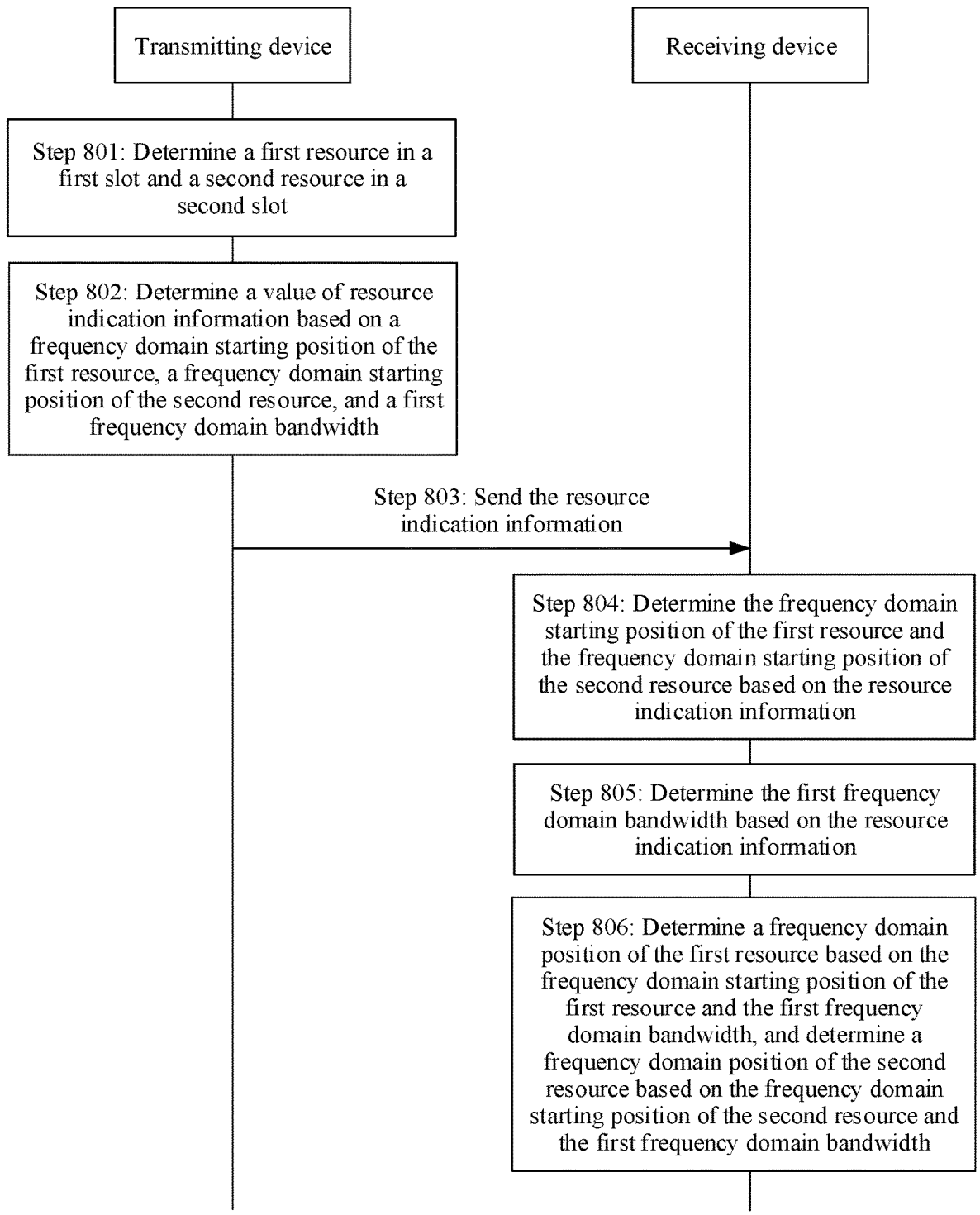
FIG. 8 is another schematic interactive diagram of a resource indication method and a resource determining method according to an embodiment of this application.

In a possible embodiment, as shown in FIG. 8, this embodiment of this application provides a resource indication method and a resource determining method. The method includes step 801, step 803, and step 804. For step 801, step 803, and step 804, correspondingly refer to the descriptions in step 501, step 502, and step 503. Details are not described herein again. In a possible implementation, the method may further include step 802 before step 803.

Step 802: The transmitting apparatus determines a value of resource indication information based on a frequency domain starting position of the first resource, a frequency domain starting position of the second resource, and a first frequency domain bandwidth.

The first frequency domain bandwidth is a frequency domain bandwidth of the first resource or a frequency domain bandwidth of the second resource.

In a possible implementation, the frequency domain bandwidth of the first resource is the same as the frequency domain bandwidth of the second resource.

In a possible implementation, the value of the resource indication information in this embodiment of this application is further determined based on a second frequency domain bandwidth, and the second frequency domain bandwidth is a frequency domain bandwidth of a resource pool.

In other words, step 802 in this embodiment of this application may be implemented in the following manner: The transmitting apparatus determines the value of the resource indication information based on the frequency domain starting position of the first resource, the frequency domain starting position of the second resource, the first frequency domain bandwidth, and the second frequency domain bandwidth.

In this embodiment of this application, the frequency domain bandwidth of the resource pool indicates a total quantity of RBs or sub-channels in a BWP, a bandwidth, or the resource pool. The frequency domain bandwidth of the resource pool may be configured by using signaling, pre-configured, or pre-defined in a protocol. This is not limited in this embodiment of this application.

In a possible implementation, the value of the resource indication information is further determined using one element or a combination of a plurality of elements of the following elements: the square of the second frequency domain bandwidth, the cube of the second frequency domain bandwidth, the second frequency domain bandwidth, and a difference between the second frequency domain bandwidth and the first frequency domain bandwidth.

In a possible implementation, the value of the resource indication information is determined using f(N) and f(N−(L−1)).

In a possible implementation, the value of the resource indication information is determined using f(N), f(N−(L−1)), (N−(L−1)), $S_0$, and $S_1$.

In an example, the value of the resource indication information satisfies:

$$RIV = f(N) - f(N-(L-1)) + (N-(L-1))*S_0 + S_1,$$

where $S_0$ represents the frequency domain starting position of the first resource; $S_1$ represents the frequency domain starting position of the second resource; L represents the first frequency domain bandwidth; N represents the second frequency domain bandwidth; $S_0$, $S_1$, N, and L are integers; RIV represents the value of the resource indication information; f(N) represents a function of an input value N; and f(N−(L−1)) represents a function of an input value (N−(L−1)).

f(N)=N(N+1)(2N+1)/6. It may be understood that, when the input value is (N−(L−1)), f(N−(L−1))={N−(L−1)}{(N−(L−1))+1}{2(N−(L−1))+1}/6.

When f(N)=N(N+1)(2N+1)/6, and f(N−(L−1))={N−(L−1)}{(N−(L−1))+1}{2(N−(L−1))+1}/6, the formula $RIV = f(N) - f(N-(L-1)) + (N-(L-1))*S_0 + S_1$ may alternatively be expressed as the following expression:

$$RIV = N(N+1)(2N+1)/6 - (N-L+1)(N-L+2)(2N-2L+3)/6 + (N-(L-1))*S_0 + S_1.$$

A sequence satisfied by the value of resource indication information is described above by using an example in which the transmitting apparatus determines the value of the resource indication information based on the frequency domain starting position of the first resource, the frequency domain starting position of the second resource, and the first frequency domain bandwidth.

It may be understood that when the transmitting apparatus determines the value of the resource indication information based on the frequency domain starting position of the first resource, the frequency domain starting position of the second resource, and the first frequency domain bandwidth, the value of the resource indication information satisfies:

$$RIV = f(N) - f(N-(S_0-S_{01}-1)) + (N-(L-1))*S_0 + S_1,$$

where $S_{01}$ represents a frequency domain ending position of the first frequency domain resource. Similarly, $$RIV=N(N+1)(2N+1)/6-(N-L+1)(N-L+2)(2N-2L+3)/6+(N-(L-1))*S_0+S_1,$$

can be replaced with:

$$RIV=N(N+1)(2N+1)/6-(N-(S_{01}-S_0)+1)(N-(S_{01}-S_0)+2)(2N-2)(S_{01}-S_0)+3)/6+(N-((S_{01}-S_0)-1))*S_0+S_1,$$

where $S_{01}-S_0$ may alternatively be replaced with $S_{11}-S_1$, and $S_{11}$ represents a frequency domain ending position of the second resource.

In another possible implementation, the value of the resource indication information is further determined using one element or a combination of a plurality of elements of the following elements:

$N^2$, $S_0$, $S_1$, $(L-1)$, $(N-L-S_0)$, $(N-1-S_1)$, and/or $N-L+1$, where $S_0$ represents the frequency domain starting position of the first resource; $S_1$ represents the frequency domain starting position of the second resource; L represents the first frequency domain bandwidth; N represents the second frequency domain bandwidth; and $S_0$, $S_1$, N, and L are integers.

In another example, the value of the resource indication information satisfies:

$$RIV=N^{2}*(L-1)+(N-L+1)*S_0+S_1; \text{ or}$$

$$RIV=N^{2}*(N-L+1)+L*(N-L-S_0)+(N-1-S_1).$$

RIV represents the value of the resource indication information; N represents the second frequency domain bandwidth; L represents the first frequency domain bandwidth; $S_0$ represents the frequency domain starting position of the first resource; $S_1$ represents the frequency domain starting position of the second resource; and $S_0$, $S_1$, N, and L are integers.

In an example, when L or L−1 is less than or equal to a first limit, the value of the resource indication information satisfies:

$$RIV=N^{2}*(L-1)+(N-L+1)*S_0+S_1.$$

In another example, when L or L−1 is greater than or equal to a second limit, the value of the resource indication information satisfies:

$$RIV=N^{2}*(N-L+1)+L*(N-L-S_0)+(N-1-S_1).$$

In another possible implementation of this embodiment of this application, $S_0$, $S_1$, N, and L in this embodiment of this application satisfy the following conditions: $0 \le S_1 \le N-1$, $0 \le S_0 \le N-1$, $1 \le L \le N$, $L+S_0 \le N$, and $L+S_1 \le N$.

It should be noted that, in this embodiment of this application, L may be replaced with $S_{01}-S_0$ or $S_{11}-S_1$; in other words, $L=S_{01}-S_0$ or $L=S_{11}-S_1$. For example, if $L=S_{01}-S_0$, $1 \le L \le N$ may be transformed into $1 \le (S_{01}-S_0) \le N$.

In this embodiment of this application, the first limit and the second limit may be equal or may not be equal. This is not limited in this embodiment of this application.

In an example, in this embodiment of this application, the first limit and the second limit may be autonomously determined by the transmitting apparatus, or may be pre-defined in a protocol, or may be obtained by the transmitting apparatus by querying a first preset table. It may be understood that the first preset table includes corresponding first limits and second limits when N is of different values.

For example, the first preset table may be shown in Table 1.

TABLE 1

| First preset table | | |
|---|---|---|
| N | First limit | Second limit |
| 10 | 5 | 5 |
| 12 | 6 | 6 |
| 15 | 7 | 8 |
| 20 | 10 | 10 |
| 24 | 12 | 12 |

Using N=10 as an example, the transmitting apparatus may determine, by querying Table 1, that both the first limit and the second limit are 5. Using N=15 as an example, the transmitting apparatus may determine, by querying Table 1, that the first limit is 7 and the second limit is 8. The first preset table in this embodiment of this application may be configured in the transmitting apparatus.

In a possible implementation, the first limit and the second limit in this embodiment of this application may be determined using any one of the following: N/2, $\lfloor N/2 \rfloor$, or $\lceil N/2 \rceil$. For example, the first limit is $\lfloor N/2 \rfloor$, and the second limit is N/2. In other words, it may also be understood that the first preset table is configured in the transmitting apparatus after another device obtains the first preset table according to N/2, $\lfloor N/2 \rfloor$, or $\lceil N/2 \rceil$.

For example, if the first limit is determined using $\lceil N/2 \rceil$ and the second limit is determined using $\lfloor N/2 \rfloor$, when N=15, the first limit is 7 and the second limit is 8.

For example, Table 2 and Table 3 respectively show, when N=6 and N=5, values that are of RIV and that are calculated based on the sequence satisfied by the resource indication information provided in this embodiment of this application. An underlined number is a value that is of RIV and that is obtained through calculation when $L-1 > \lfloor N/2 \rfloor$.

TABLE 2

| RIV when N = 6 | | | | | | | | | | | | | | | | | |
|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 |
| 36 | 37 | 38 | 39 | 40 | 41 | 42 | 43 | 44 | 45 | 46 | 47 | 48 | 49 | 50 | 51 | 52 | 53 |
| 72 | 73 | 74 | 75 | 76 | 77 | 78 | 79 | 80 | 81 | 82 | 83 | 84 | 85 | 86 | 87 | 0 | 0 |
| 108 | 109 | 110 | 111 | 112 | 113 | 114 | 115 | 116 | 0 | 0 | 0 | 0 | 0 | 0 | 0 | 0 | 0 |
| <u>102</u> | <u>101</u> | <u>97</u> | <u>96</u> | 0 | 0 | 0 | 0 | 0 | 0 | 0 | 0 | 0 | 0 | 0 | 0 | 0 | 0 |
| <u>71</u> | 0 | 0 | 0 | 0 | 0 | 0 | 0 | 0 | 0 | 0 | 0 | 0 | 0 | 0 | 0 | 0 | 0 |
| 18 | 19 | 20 | 21 | 22 | 23 | 24 | 25 | 26 | 27 | 28 | 29 | 30 | 31 | 32 | 33 | 34 | 35 |
| 54 | 55 | 56 | 57 | 58 | 59 | 60 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |

TABLE 2-continued

RIV when N = 6

| 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |

TABLE 3

RIV when N = 5

| 0  | 1  | 2  | 3  | 4  | 5  | 6  | 7  | 8  | 9 | 10 | 11 | 12 | 13 | 14 | 15 | 16 | 17 | 18 | 19 | 20 | 21 | 22 | 23 | 24 |
|----|----|----|----|----|----|----|----|----|---|----|----|----|----|----|----|----|----|----|----|----|----|----|----|----|
| 25 | 26 | 27 | 28 | 29 | 30 | 31 | 32 | 33 | 34| 35 | 36 | 37 | 38 | 39 | 40 | 0  | 0  | 0  | 0  | 0  | 0  | 0  | 0  | 0  |
| 50 | 51 | 52 | 53 | 54 | 55 | 56 | 57 | 58 | 0 | 0  | 0  | 0  | 0  | 0  | 0  | 0  | 0  | 0  | 0  | 0  | 0  | 0  | 0  | 0  |
| 70 | 69 | 66 | 65 | 0  | 0  | 0  | 0  | 0  | 0 | 0  | 0  | 0  | 0  | 0  | 0  | 0  | 0  | 0  | 0  | 0  | 0  | 0  | 0  | 0  |
| 49 | 0  | 0  | 0  | 0  | 0  | 0  | 0  | 0  | 0 | 0  | 0  | 0  | 0  | 0  | 0  | 0  | 0  | 0  | 0  | 0  | 0  | 0  | 0  | 0  |

It should be noted that the value of the resource indication information in this embodiment of this application may alternatively be obtained by the transmitting apparatus by querying a preset RIV value table. The preset RIV value table is obtained by another device through calculation based on the sequence satisfied by the value of the resource indication information when any one of N, $S_0$, $S_1$, and L has a different value. The transmitting apparatus may obtain the value of the resource indication information by querying the preset RIV value table, and skip the foregoing process of calculating RIV based on the sequence.

In a possible implementation, as shown in FIG. 8, the method provided in this embodiment of this application may further include the following step.

Step 805: The receiving apparatus determines the first frequency domain bandwidth based on the resource indication information, where the first frequency domain bandwidth is the frequency domain bandwidth of the first resource or the frequency domain bandwidth of the second resource.

In this embodiment of this application, a sequence of step 805 and step 804 is not limited. To be specific, the receiving apparatus may perform step 805 before step 804, or the receiving apparatus may perform step 804 before step 805, or the receiving apparatus may simultaneously perform step 805 and step 804.

It should be noted that, in this embodiment of this application, the receiving apparatus and the transmitting apparatus may negotiate the first frequency domain bandwidth in advance, or the first frequency domain bandwidth is pre-defined in a protocol or pre-configured in the receiving apparatus. In other words, the receiving apparatus knows a value of the first frequency domain bandwidth. In this case, the receiving apparatus skips step 805. When the receiving apparatus does not know the first frequency domain bandwidth, to determine the frequency domain position of the first resource and the frequency domain position of the second resource, the receiving apparatus may perform step 805 to determine the first frequency domain bandwidth.

In a possible implementation, the first frequency domain bandwidth is determined using the value of the resource indication information and the square of the second frequency domain bandwidth, and the second frequency domain bandwidth is the frequency domain bandwidth of the resource pool. Alternatively, the first frequency domain bandwidth is obtained by using a preset constant. Alternatively, the first frequency domain bandwidth is determined using a preset constant and the second frequency domain bandwidth. For example, the preset constant may be $a$, and $a$ may be obtained by the receiving apparatus by querying a preset table 1. The preset table 1 includes $a$ when N and RIV are of different values.

For example, as shown in Table 4, Table 4 shows a when N is of different values in this embodiment of this application.

TABLE 4

Preset table 1

| RIV | N | a |
|-----|---|---|
| 36  | 6 | 1 |
| 72  | 6 | 2 |

The preset table 1 is listed in Table 4 by using an example in which RIV is 36 or 72 and N is 6. It may be understood that Table 4 is merely an example, and when N and RIV are of other values, $a$ may also be of another value.

Specifically, the preset table 1 may be obtained by another device according to $a = RIV/N^2$, $a = \lfloor RIV/N^2 \rfloor$, or $a = \lceil RIV/N \rceil$, and then is configured in the receiving apparatus.

In an example, the first frequency domain bandwidth satisfies: L=a+1, L=a, or L=N+1−a, where $a = RIV/N^2$, $a = \lfloor RIV/N^2 \rfloor$, or $a = \lceil RIV/N^2 \rceil$; and L represents the first frequency domain bandwidth, N represents the second frequency domain bandwidth, and RIV represents the value of the resource indication information.

It should be noted that, on the one hand, the receiving apparatus in this embodiment of this application may obtain a by querying the preset table 1 based on N and RIV. In this way, a process of calculating a by the receiving apparatus can be omitted.

On the other hand, in this embodiment of this application, the receiving apparatus may obtain a according to $a = RIV/N^2$, $a = \lfloor RIV/N^2 \rfloor$, or $a = \lceil RIV/N^2 \rceil$; or a is pre-defined in a protocol. This is not limited in this embodiment of this application.

In a possible implementation, step 503 in this embodiment of this application may be implemented in the following manner: The receiving apparatus determines the frequency domain starting position of the first resource and the frequency domain starting position of the second resource based on the resource indication information and the second frequency domain bandwidth. The second frequency domain bandwidth is the frequency domain bandwidth of the resource pool.

The resource pool may be the first resource set corresponding to the first resource or the second resource set corresponding to the second resource.

In a possible implementation, the frequency domain starting position of the first resource or the frequency domain starting position of the second resource is determined using the value of the resource indication information and the square of the second frequency domain bandwidth.

In a possible implementation, the frequency domain starting position of the first resource or the frequency domain starting position of the second resource is determined using the value of the resource indication information and the cube of the second frequency domain bandwidth of the resource pool.

In a possible implementation, the frequency domain starting position of the first resource or the frequency domain starting position of the second resource is determined using the value of the resource indication information, the square of the second frequency domain bandwidth of the resource pool, and the first frequency domain bandwidth.

In a possible implementation, when a first value is less than or equal to a third limit, the frequency domain starting position of the first resource or the frequency domain starting position of the second resource is determined using $RIV-N^2*(L-1)$, where L represents the first frequency domain bandwidth, N represents the second frequency domain bandwidth, and RIV represents the value of the resource indication information.

In a possible implementation, the frequency domain starting position of the first resource satisfies:

$$S_0=(RIV-N^2*(L-1))/(N-L+1) \text{ and/or } S_1=(RIV-N^2*(L-1))\bmod(N-L+1);$$

or $$S_0=g(\{(N^2(N-L+1)+(L+1)(N-1)-RIV)/L\}) \text{ and/or}$$

$$S_1=\{(N^2(N-L+1)+(L+1)(N-1)-RIV)\}\bmod L,$$

where g( ) represents a function for rounding up or rounding down an input variable, L represents the first frequency domain bandwidth, N represents the second frequency domain bandwidth, and RIV represents the value of the resource indication information.

A mod B in this embodiment of this application indicates that A modulo B.

In a possible implementation, when the first value is less than or equal to the third limit, the frequency domain starting position of the first resource satisfies: $S_0=(RIV-N^2*(L-1))/(N-L+1)$; and the frequency domain starting position of the second resource satisfies: $S_1=(RIV-N^2*(L-1))\bmod(N-L+1)$, where L represents the first frequency domain bandwidth, N represents the second frequency domain bandwidth, RIV represents the value of the resource indication information, $S_0$ represents the frequency domain starting position of the first resource, and $S_1$ represents the frequency domain starting position of the second resource.

In a possible implementation, when a first value is greater than or equal to a fourth limit, the frequency domain starting position of the first resource or the frequency domain starting position of the second resource is determined using $N^2(N-L+1)$, where L represents the first frequency domain bandwidth, and N represents the second frequency domain bandwidth.

In a possible implementation, when the first value is greater than or equal to the fourth limit, the frequency domain starting position of the first resource or the frequency domain starting position of the second resource is determined using $$N^2(N-L+1)+(L+1)(N-1)-RIV.$$

In a possible implementation, when the first value is greater than or equal to the fourth limit, the frequency domain starting position of the first resource satisfies:

$$S_0=\lfloor\{(N^2(N-L+1)+(L+1)(N-1)-RIV)/L\}\rfloor; \text{ or}$$

$$S_0=\lceil\{(N^2(N-L+1)+(L+1)(N-1)-RIV)/L\}\rceil;$$

and/or the frequency domain starting position of the second resource satisfies:

$$S_1=\{(N^2(N-L+1)+(L+1)(N-1)-RIV)\}\bmod L.$$

In a possible implementation, the first value is determined using the value of the resource indication information.

In a possible implementation, the first value is any one of the following: $RIV/N^2$, $\lfloor RIV/N^2 \rfloor$, $\lceil RIV/N^2 \rceil$, or the value of the resource indication information.

In a possible implementation, the third limit and the fourth limit in this embodiment of this application may be values pre-defined in a protocol, or may be obtained by the receiving apparatus from a third preset table; or the third limit or the fourth limit is autonomously determined by the receiving apparatus.

For example, the third preset table may be shown in Table 5.

TABLE 5

| Third preset table | | |
|---|---|---|
| RIV | N | Third limit |
| — | 12 | 6 |
| — | 5 | 2.5 |
| RIV | N | Fourth limit |
| 125 | 5 | 1 |

For example, if N=12, the receiving apparatus may determine, by querying the third preset table shown in Table 5, that the third limit is 6. If N=5, the receiving apparatus may determine, by querying the third preset table shown in Table 5, that the third limit is 2.5. If the receiving apparatus receives RIV=125, and the receiving apparatus determines N=12, the receiving apparatus may determine, by querying the third preset table shown in Table 5, that the fourth limit is 1.

It should be noted that the third preset table includes third limits or fourth limits when N is of different values, or the third preset table includes one or more third limits or fourth limits, and each third limit or fourth limit corresponds to one group of parameters (N, RIV).

It may be understood that Table 5 shows only an example of a third limit or a fourth limit corresponding to N=5 or N=12. When N and RIV are of other values, the third limit or the fourth limit may also be of another value.

Specifically, the third preset table may be determined by another device or the receiving apparatus based on the second frequency domain bandwidth, or the third preset table may be configured in the receiving apparatus after being determined by another device or the receiving apparatus based on the second frequency domain bandwidth and the value of the resource indication information. For example, the another device or the receiving apparatus determines the third limit or the fourth limit according to any one of N/2, $\lfloor N/2 \rfloor$, $\lceil N/2 \rceil$, $RIV/N^3$, $2RIV/N^3$, $\lfloor 2RIV/N^3 \rfloor$, $\lceil 2RIV/N^3 \rceil$, $\lceil RIV/N^3 \rceil$, or $\lfloor RIV/N^3 \rfloor$, and then obtains the third preset table. For example, the third limit is N/2, and the fourth limit is $2RIV/N^3$.

In a possible implementation, the third limit and the fourth limit are determined using the second frequency domain bandwidth, or the third limit and the fourth limit are determined using the second frequency domain bandwidth and the value of the resource indication information.

For example, the third limit or the fourth limit is determined using any one of the following: $N/2$, $\lfloor N/2 \rfloor$, $\lceil N/2 \rceil$, $RIV/N^3$, $2RIV/N^3$, $\lfloor 2RIV/N^3 \rfloor$, $\lceil 2RIV/N^2 \rceil$, $\lceil RIV/N^3 \rceil$, or $\lfloor RIV/N^3 \rfloor$.

As shown in FIG. 8, in a possible embodiment, after step 804, the method provided in this embodiment of this application may further include the following step.

Step 806: The receiving apparatus determines the frequency domain position of the first resource based on the frequency domain starting position of the first resource and the first frequency domain bandwidth, and determines the frequency domain position of the second resource based on the frequency domain starting position of the second resource and the first frequency domain bandwidth.

In a possible implementation, a quantity of bits occupied by the resource indication information is less than or equal to a first threshold.

In this embodiment of this application, the first threshold may be autonomously determined by the transmitting apparatus (for example, determined by the transmitting apparatus based on N), or may be pre-defined in a protocol, or the first threshold may be obtained by the transmitting apparatus by querying a second preset table. The second preset table includes at least first thresholds obtained based on N when N is of different values.

For example, another device may obtain, according to $\lfloor \log_2^{(N(N+1)(2N+1)/6)} \rfloor$, $\lceil \log_2^{(N(N+1)(2N+1)/6)} \rceil$, or $\log_2^{(N(N+1)(2N+1)/6)}$, corresponding first thresholds when N is of different values, to obtain the second preset table. In this way, the transmitting apparatus may obtain the first threshold by querying the second preset table.

In a possible implementation, the first threshold is obtained according to a formula $\lfloor \log_2^{(N(N+1)(2N+1)/6)} \rfloor$, $\lceil \log_2^{(N(N+1)(2N+1)/6)} \rceil$, or $\log_2^{(N(N+1)(2N+1)/6)}$. In other words, the transmitting apparatus may obtain the first threshold according to $\lfloor \log_2^{(N(N+1)(2N+1)/6)} \rfloor$, $\lceil \log_2^{(N(N+1)(2N+1)/6)} \rceil$, or $\log_2^{(N(N+1)(2N+1)/6)}$.

For example, in a possible implementation, step 503 in this embodiment of this application may alternatively be implemented in the following manner: The receiving apparatus demodulates values of $S_0$, $S_1$, and L based on the value of the received resource indication information by using an attempt method in a manner of taking different values of $S_0$, $S_1$, and L. The attempt method is traversing all values of $S_0$, $S_1$, and L in a range of configured values of N, for example, N=10, 12, 15, 20, or 24, to make $$RIV = f(N) - f(N-(L-1)) + (N-(L-1))*S_0 + S_1 \text{ or}$$

$$RIV = N(N+1)(2N+1)/6 - (N-L+1)(N-L+2)(2N-2L+3)/6 + (N-(L-1))*S_0 + S_1$$

be true, so as to obtain corresponding $S_0$, $S_1$, and L.

In a possible implementation, the method provided in this embodiment of this application may further include: detecting, by the receiving apparatus, data on the first resource and the second resource.

Specifically, when the resource indication information indicates the receiving apparatus to receive the data on the first resource and the second resource, the receiving apparatus may detect the data on the first resource and the second resource.

In a possible implementation, the method provided in this embodiment of this application may further include: determining, by the receiving apparatus, an available resource based on the resource indication information. Specifically, when the resource indication information indicates the receiving apparatus to determine the available resource, the receiving apparatus determines the available resource based on the resource indication information.

It should be noted that, although the transmitting apparatus selects the first resource and the second resource, and notifies the receiving apparatus of the frequency domain position of the first resource and the frequency domain position of the second resource by using the resource indication information, if the transmitting apparatus does not send data on the first resource and the second resource, on the one hand, when a priority of data sent by the receiving apparatus is higher than a priority of data sent by the transmitting apparatus, or the receiving apparatus determines that the transmitting apparatus temporarily does not have data to be sent, the receiving apparatus may still determine that the available resource is one or both of the first resource or the second resource; on the other hand, the available resource determined by the receiving apparatus includes neither the first resource nor the second resource.

The foregoing mainly describes the solutions in the embodiments of this application from a perspective of interaction between the network elements. It can be understood that each of all the network elements, such as the transmitting apparatus or the receiving apparatus, includes hardware structures and/or software modules for executing corresponding functions, to implement the foregoing functions. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the transmitting apparatus or the receiving apparatus may be divided into function units based on the foregoing method example. For example, each function unit may be obtained through division based on each corresponding function, or two or more functions may be integrated into one processing unit. The integrated unit may be implemented in a form of hardware, or may be implemented in a form of a software function unit. It should be noted that in the embodiments of this application, division into the units is an example and is merely logical function division, and may be other division in an actual implementation.

The foregoing describes the methods in the embodiments of this application with reference to FIG. 5 to FIG. 8. The following describes communications apparatuses that are provided in embodiments of this application and that perform the foregoing methods. A person skilled in the art may understand that the method and the apparatus may be mutually combined and referenced. A communications apparatus provided in an embodiment of this application may perform the method performed by the transmitting apparatus in the foregoing resource indication method and the foregoing resource determining method. Alternatively, the communications apparatus may perform the method performed by the receiving apparatus in the foregoing resource indication method and the foregoing resource determining method in the foregoing embodiments.

An example in which each function module is obtained through division based on each corresponding function is used below for description.

Figure 9:
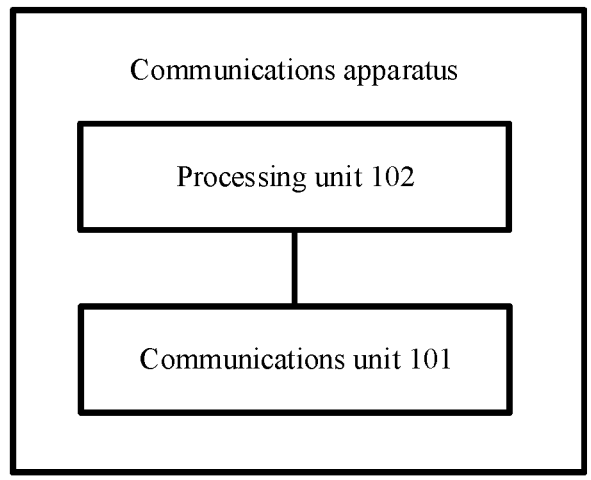
FIG. 9 is a schematic structural diagram of a communications apparatus according to an embodiment of this application.

FIG. 9 is a schematic structural diagram of a communications apparatus according to an embodiment of this application. The communications apparatus includes a communications unit 101 and a processing unit 102. The communications unit 101 is configured to support the communications apparatus in performing a step of sending or receiving information. The processing unit 102 is configured to support the communications apparatus in performing a step of processing information.

In an example, the communications apparatus may be a transmitting apparatus, and the communications unit 101 is used by the communications apparatus to communicate with an external network element, for example, performing the signal sending and receiving operations of the transmitting apparatus in the foregoing embodiment. The processing unit 102 is configured to perform the signal processing operation of the transmitting apparatus in the foregoing embodiment. For example, the communications unit 101 is configured to perform the sending step performed by the transmitting apparatus in step 502 in the foregoing embodiment. For example, the processing unit 102 is configured to perform the step performed by the transmitting apparatus in step 501 in the foregoing embodiment.

In a possible implementation, the processing unit 102 is configured to perform the step performed by the transmitting apparatus in step 802 in the foregoing embodiment.

In another example, the communications apparatus may be a receiving apparatus, and the communications unit 101 is used by the communications apparatus to communicate with an external network element, for example, performing the signal sending and receiving operations of the receiving apparatus in the foregoing embodiment. The processing unit 102 is configured to perform the signal processing operation of the receiving apparatus in the foregoing embodiment. For example, the communications unit 101 is configured to perform the receiving step performed by the receiving apparatus in step 502 in the foregoing embodiment. The processing unit 102 is configured to perform the step performed by the receiving apparatus in step 503 in the foregoing embodiment.

In a possible implementation, the processing unit 102 is further configured to support the communications apparatus in performing step 805 and step 806 in the foregoing embodiment.

Optionally, the communications apparatus may further include a storage unit. The processing unit 102, the communications unit 101, and the storage unit are connected through a communications bus.

The storage unit may include one or more memories. The memory may be a component, in one or more devices or circuits, configured to store a program or data.

The storage unit may exist independently, and is connected to the processing unit 102 of the communications apparatus through the communications bus. The storage unit may alternatively be integrated with the processing unit.

The communications apparatus may be used in a communications device, a circuit, a hardware component, or a chip.

For example, the communications apparatus may be a chip in the transmitting device 10/receiving device 20 in the embodiments of this application. The communications unit 101 may be an input/output interface, a pin, a circuit, or the like. Optionally, the storage unit may store computer-executable instructions of a method on a side of the transmitting device 10/receiving device 20, so that the processing unit 102 performs the method on the side of the transmitting device 10/receiving device 20 in the foregoing embodiment. The storage unit may be a register, a cache, a RAM, or the like, and the storage unit may be integrated with the processing unit 102. The storage unit may be a ROM or another type of static storage device that can store static information and instructions, and the storage unit may be independent of the processing unit 102.

An embodiment of this application provides a communications apparatus. The communications apparatus includes one or more modules, configured to implement the method performed by the transmitting apparatus in step 501 and step 502 or step 801 to step 803. The one or more modules may correspond to the step performed by the transmitting apparatus in step 501 and step 502 or step 801 to step 803. Specifically, in this embodiment of this application, for each step in the method performed by the transmitting apparatus, the communications apparatus includes a unit or a module for performing the step in the method.

An embodiment of this application provides a communications apparatus. The communications apparatus includes one or more modules, configured to implement the method performed by the receiving apparatus in step 502 and step 503 or step 803 to step 806. The one or more modules may correspond to the step performed by the receiving apparatus in step 502 and step 503 or step 803 to step 806. Specifically, in this embodiment of this application, for each step in the method performed by the receiving apparatus, the receiving apparatus includes a unit or a module for performing the step in the method.

Figure 10:
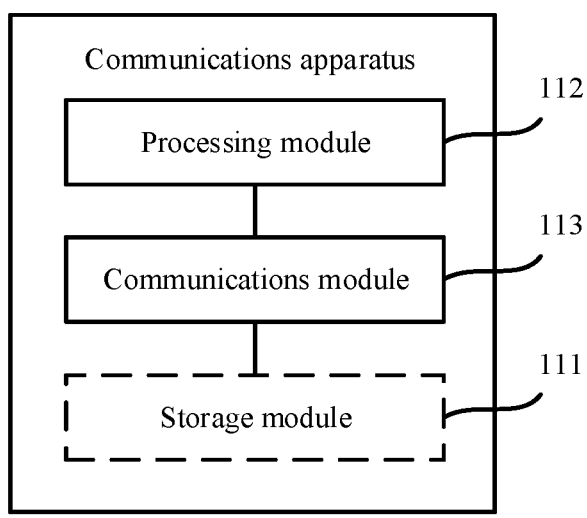
FIG. 10 is another schematic structural diagram of a communications apparatus according to an embodiment of this application.

For example, when an integrated unit is used, FIG. 10 is a schematic diagram of a possible logical structure of the communications apparatus in the foregoing embodiments. The communications apparatus may be the transmitting apparatus in the foregoing embodiment. Alternatively, the communications apparatus may be the receiving apparatus in the foregoing embodiment. The communications apparatus includes a processing module 112 and a communications module 113. The processing module 112 is configured to control and manage an action of the communications apparatus. The communications module 113 is configured to perform a step of processing a message or data on a side of the communications apparatus.

Optionally, the communications apparatus may further include a storage module 111, configured to store program code and data that are of the communications apparatus.

For example, the communications apparatus may be the transmitting apparatus in the foregoing embodiment. The communications module 113 is configured to support the communications apparatus in performing the step performed by the transmitting apparatus in step 502 in the foregoing embodiment. The processing module 112 is configured to support the communications apparatus in performing step 501 in the foregoing embodiment, and/or is configured to perform another process performed by the communications apparatus in the technology described in this specification.

In a possible implementation, the processing module 112 is configured to perform the step performed by the transmitting apparatus in step 802 in the foregoing embodiment.

For another example, the communications apparatus may be the receiving apparatus in the foregoing embodiment. The communications module 113 is configured to support the communications apparatus in performing the step performed by the receiving apparatus in step 502 in the foregoing embodiment. The processing module 112 is configured to support the communications apparatus in performing step 503 in the foregoing embodiment. In a possible implementation, the processing module 112 is further configured to support the communications apparatus in performing step 805 and step 806 in the foregoing embodiment.

The processing module 112 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content in the present disclosure. Alternatively, the processor may be a combination of processors implementing a computing function, for example, a combination of one or more microprocessors, or a combination of a digital signal processor and a microprocessor. The communications module 113 may be a communications interface, a transceiver, a transceiver circuit, an interface circuit, or the like. The storage module 111 may be a memory.

When the processing module 112 is the processor 41 or the processor 45, the communications module 113 is the transceiver 43, and the storage module 111 is the memory 42, the communications apparatus in this application may be the communications device shown in FIG. 4.

Figure 11:
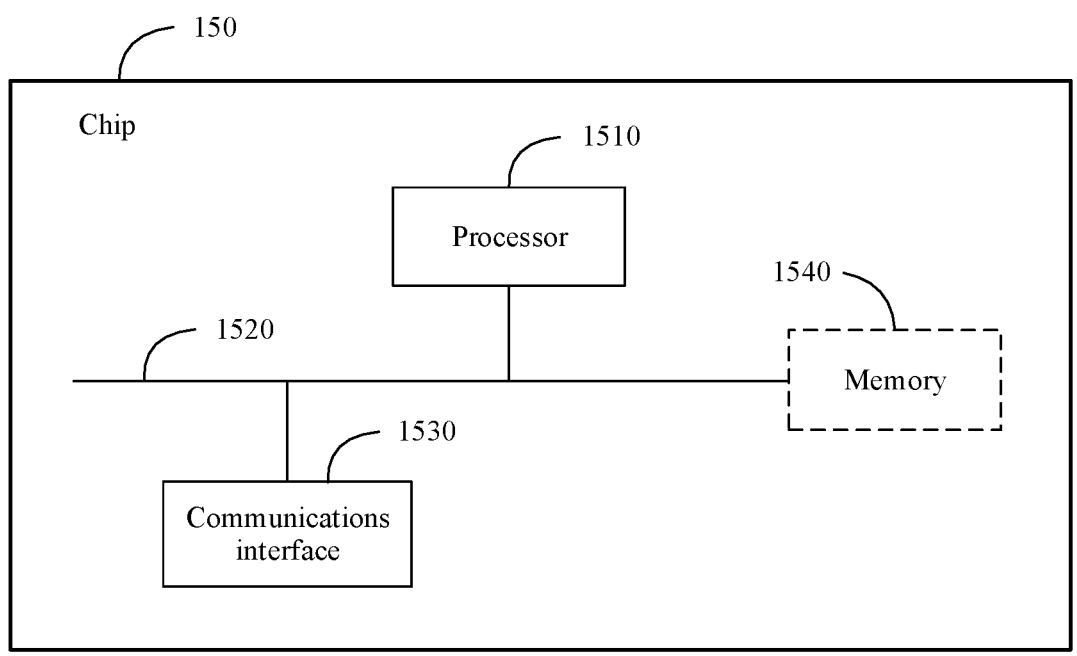
FIG. 11 is a schematic structural diagram of a chip according to an embodiment of this application.

FIG. 11 is a schematic structural diagram of a chip 150 according to an embodiment of the present disclosure. The chip 150 includes one or more (including two) processors 1510 and a communications interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements, an executable module or a data structure, or a subset thereof, or an extension set thereof.

In this embodiment of the present disclosure, a corresponding operation is performed by invoking the operation instructions stored in the memory 1540 (where the operation instructions may be stored in an operating system).

In a possible implementation, structures of chips used by a transmitting apparatus and a receiving apparatus are similar, and different apparatuses may use different chips to implement respective functions.

The processor 1510 controls operations of the transmitting apparatus and the receiving apparatus. The processor 1510 may also be referred to as a central processing unit (CPU). The memory 1540 may include a read-only memory and a random access memory, and provide instructions and data for the processor 1510. A part of the memory 1540 may further include a non-volatile random access memory (NVRAM). For example, in an application, the memory 1540, the communications interface 1530, and the memory 1540 are coupled together through a bus system 1520. The bus system 1520 may further include a power bus, a control bus, a status signal bus, and the like in addition to a data bus. However, for clear description, various buses are marked as the bus system 1520 in FIG. 11.

The foregoing communications unit may be an interface circuit or a communications interface of the apparatus, and is configured to receive a signal from another apparatus. For example, when the apparatus is implemented as a chip, the communications unit is an interface circuit or a communications interface that is of the chip and that is configured to receive a signal from another chip or apparatus or send a signal.

For example, the communications unit may include a sending unit and a receiving unit. The sending unit is configured to send a signal to another apparatus. The receiving unit is configured to receive a signal from another apparatus.

The method disclosed in the foregoing embodiments of the present disclosure may be applied to the processor 1510, or implemented by the processor 1510. The processor 1510 may be an integrated circuit chip and has a signal processing capability. In an implementation process, the steps in the foregoing method may be implemented by using a hardware integrated logical circuit in the processor 1510, or by using an instruction in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1510 may implement or perform the methods, steps, and logical block diagrams that are disclosed in the embodiments of the present disclosure. The general-purpose processor may be a microprocessor, any conventional processor, or the like. The steps of the methods disclosed with reference to the embodiments of the present disclosure may be directly performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communications interface 1530 is configured to perform receiving and sending steps of the transmitting apparatus and the receiving apparatus in the embodiment shown in FIG. 5 or FIG. 8. The processor 1510 is configured to perform the processing steps of the transmitting apparatus and the receiving apparatus in the embodiment shown in FIG. 5 or FIG. 8.

In the foregoing embodiment, the instructions that are stored in the memory and that are to be executed by the processor may be implemented in a form of a computer program product. The computer program product may be written into the memory in advance, or may be downloaded in a form of software and installed in the memory.

The computer program product includes one or more computer instructions. When the computer program/instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state disk, SSD)), or the like.

An embodiment of this application further provides a computer-readable storage medium. All or some of the methods described in the foregoing embodiments may be implemented by using software, hardware, firmware, or any combination thereof. If the methods are implemented by using software, functions may be stored in or transmitted on the computer-readable medium as one or more instructions or code. The computer-readable medium may include a computer storage medium and a communications medium, and may further include any medium that can transfer a computer program from one place to another. The storage medium may be any target medium that can be accessed by a computer.

In an optional design, the computer-readable medium may include a RAM, a ROM, an EEPROM, a CD-ROM or another optical disc storage, a magnetic disk storage or another magnetic storage device, or any other medium that is used to carry or store required program code in a form of an instruction or a data structure and that is accessible by the computer. In addition, any connection is appropriately referred to as a computer-readable medium. For example, if a coaxial cable, an optical fiber cable, a twisted pair, a digital subscriber line (DSL), or wireless technologies (such as infrared, radio, and a microwave) are used to transmit software from a website, a server, or another remote source, the coaxial cable, the optical fiber cable, the twisted pair, the DSL, or the wireless technologies such as infrared, radio, and a microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. All or some of the methods described in the foregoing embodiments may be implemented by using software, hardware, firmware, or any combination thereof. When the methods are implemented by using software, all or some of the method may be implemented in a form of a computer program product. The computer program product includes one or more computer instructions. When the computer program/instructions are loaded and executed on a computer, all or some of the procedures or functions according to the foregoing method embodiments are generated. The computer may be a general-purpose computer, a special-purpose computer, a computer network, a base station, a terminal, or another programmable apparatus.

In the foregoing specific implementations, the objectives, technical solutions, and benefits of the present disclosure are further described in detail. It should be understood that the foregoing descriptions are merely specific embodiments of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A method, comprising:
receiving resource indication information from a first device in a third slot, wherein a value of the resource indication information is a resource indication value (RIV); and
determining a frequency domain starting position of a first resource in a first slot, a frequency domain starting position of a second resource in a second slot, and a first frequency domain bandwidth based on the RIV,
wherein the first slot and the second slot are later than the third slot, the first resource and the second resource are candidate to-be-sent resources of the first device, the first frequency domain bandwidth is a frequency domain bandwidth of the first resource or a frequency domain bandwidth of the second resource, and the frequency domain bandwidth of the first resource is the same as the frequency domain bandwidth of the second resource;
wherein the relationship between the RIV and the frequency domain starting position of the first resource, the frequency domain starting position of the second resource, and the first frequency domain bandwidth satisfies:

$$RIV=S_1+S_0\times(N-(L-1))+\Sigma_{l=1}^{L-1}(N+1-l)^2,$$

wherein:
$S_0$ represents the frequency domain starting position of the first resource,
$S_1$ represents the frequency domain starting position of the second resource,
L represents the first frequency domain bandwidth, and
N represents a second frequency domain bandwidth;
wherein the second frequency domain bandwidth is the frequency domain bandwidth of the resource pool; and
wherein N and L are integers.

2. The method according to claim 1, wherein the relationship between the RIV and the $S_0$, the $S_1$, and the L is:

$$RIV=N(N+1)(2N+1)/6-(N-L+1)(N-L+2)(2N-2L+3)/6+(N-(L-1))*S_0+S_1.$$

3. The method according to claim 1, wherein the determining the frequency domain starting position of the first resource and the frequency domain starting position of the second resource based on the RIV comprises:
determining the frequency domain starting position of the first resource and the frequency domain starting position of the second resource based on the RIV and a second frequency domain bandwidth, wherein the second frequency domain bandwidth is the frequency domain bandwidth of the resource pool.

4. The method according to claim 1, wherein the first device is a terminal device, or a base station, or a road side unit.

5. The method according to claim 1, wherein the frequency domain bandwidth of a resource pool is a number of sub-channels in the resource pool, and the first frequency domain bandwidth is a number of sub-channels of the first resource or the second resource.

6. An apparatus, comprising:
at least one processor; and
one or more memories coupled to the at least one processor and storing program instructions for execution by the at least one processor to:

receive resource indication information from a first device in a third slot, wherein a value of the resource indication information is a resource indication value (RIV); and determine a frequency domain starting position of a first resource in a first slot, a frequency domain starting position of a second resource in a second slot, and a first frequency domain bandwidth based on the RIV, wherein the first slot and the second slot are later than the third slot, the first resource and the second resource are candidate to-be-sent resources of the first device, the first frequency domain bandwidth is a frequency domain bandwidth of the first resource or a frequency domain bandwidth of the second resource, and the frequency domain bandwidth of the first resource is the same as the frequency domain bandwidth of the second resource;

wherein the relationship between the RIV and the frequency domain starting position of the first resource, the frequency domain starting position of the second resource, and the first frequency domain bandwidth satisfies:

$$RIV=S_1+S_0\times(N-(L-1))+\Sigma_{l=1}^{L-1}(N+1-l)^2,$$

wherein:
$S_0$ represents the frequency domain starting position of the first resource,
$S_1$ represents the frequency domain starting position of the second resource,
L represents the first frequency domain bandwidth, and
N represents a second frequency domain bandwidth;
wherein the second frequency domain bandwidth is the frequency domain bandwidth of the resource pool; and
wherein N and L are integers.

7. The apparatus according to claim 6, wherein the relationship between the RIV and the frequency domain starting position of the first resource, the frequency domain starting position of the second resource, and the first frequency domain bandwidth is:

$$RIV=N(N+1)(2N+1)/6-(N-L+1)(N-L+2)(2N-2L+3)/6+(N-(L-1))*S_0+S_1.$$

8. The apparatus according to claim 6, wherein the one or more memories further store program instructions for execution by the at least one processor to:
determine the frequency domain starting position of the first resource and the frequency domain starting position of the second resource based on the RIV and a second frequency domain bandwidth, wherein the second frequency domain bandwidth is the frequency domain bandwidth of the resource pool.

9. The apparatus according to claim 6, wherein the first device is a terminal device, or a base station, or a road side unit.

10. The apparatus according to claim 6, wherein the frequency domain bandwidth of a resource pool is a number of sub-channels in the resource pool, and the first frequency domain bandwidth is a number of sub-channels of the first resource or the second resource.

11. A non-transitory computer-readable media storing computer instructions that, when executed by one or more processors, cause the one or more processors to perform the steps of:

receiving resource indication information from a first device in a third slot, wherein a value of the resource indication information is a resource indication value (RIV); and determining a frequency domain starting position of a first resource in a first slot, a frequency domain starting position of a second resource in a second slot, and a first frequency domain bandwidth based on the RIV, wherein the first slot and the second slot are later than the third slot, the first resource and the second resource are candidate to-be-sent resources of the first device, the first frequency domain bandwidth is a frequency domain bandwidth of the first resource or a frequency domain bandwidth of the second resource, and the frequency domain bandwidth of the first resource is the same as the frequency domain bandwidth of the second resource;

wherein the relationship between the RIV and the frequency domain starting position of the first resource, the frequency domain starting position of the second resource, and the first frequency domain bandwidth satisfies:

$$RIV=S_1+S_0\times(N-(L-1))+\Sigma_{l=1}^{L-1}(N+1-l)^2,$$

wherein:
$S_0$ represents the frequency domain starting position of the first resource,
$S_1$ represents the frequency domain starting position of the second resource,
L represents the first frequency domain bandwidth, and
N represents a second frequency domain bandwidth;
wherein the second frequency domain bandwidth is the frequency domain bandwidth of the resource pool; and
wherein N and L are integers.

12. The non-transitory computer-readable media according to claim 11, wherein the relationship between the RIV and the frequency domain starting position of the first resource, the frequency domain starting position of the second resource, and the first frequency domain bandwidth is:

$$RIV=N(N+1)(2N+1)/6-(N-L+1)(N-L+2)(2N-2L+3)/6+(N-(L-1))*S_0+S_1.$$

13. The non-transitory computer-readable media according to claim 11, wherein the determining the frequency domain starting position of the first resource and the frequency domain starting position of the second resource based on the RIV comprises:
determining the frequency domain starting position of the first resource and the frequency domain starting position of the second resource based on the RIV and a second frequency domain bandwidth, wherein the second frequency domain bandwidth is the frequency domain bandwidth of the resource pool.

14. The non-transitory computer-readable media according to claim 11, wherein the first device is a terminal device, or a base station, or a road side unit.

15. The non-transitory computer-readable media according to claim 11, wherein the frequency domain bandwidth of a resource pool is a number of sub-channels in the resource pool, and the first frequency domain bandwidth is a number of sub-channels of the first resource or the second resource.

* * * * *